US012782197B2

(12) United States Patent
Lemieux et al.

(10) Patent No.: US 12,782,197 B2
(45) Date of Patent: Nov. 3, 2026

(54) SYSTEM AND METHOD FOR MONITORING AN ENDLESS TRACK OF A TRACK SYSTEM

(71) Applicant: SOUCY INTERNATIONAL INC., Drummondville (CA)

(72) Inventors: Yves Lemieux, Montreal (CA); Leila Brion, Gardanne (FR); Eric Halstead, Ste-Marie-Madeleine (CA)

(73) Assignee: SOUCY INTERNATIONAL INC., Drummondville (CA)

(*) Notice: Subject to any disclaimer, the term of this patent is extended or adjusted under 35 U.S.C. 154(b) by 298 days.

(21) Appl. No.: 18/685,297

(22) PCT Filed: Aug. 15, 2022

(86) PCT No.: PCT/CA2022/051236
§ 371 (c)(1),
(2) Date: Feb. 21, 2024

(87) PCT Pub. No.: WO2023/023842
PCT Pub. Date: Mar. 2, 2023

(65) Prior Publication Data

US 2024/0353264 A1 Oct. 24, 2024

Related U.S. Application Data

(60) Provisional application No. 63/236,741, filed on Aug. 25, 2021.

(51) Int. Cl.
*G01J 5/00* (2022.01)
*B62D 55/24* (2006.01)
(Continued)

(52) U.S. Cl.
CPC .......... *G01J 5/0022* (2013.01); *B62D 55/244* (2013.01); *B62D 55/26* (2013.01);
(Continued)

(58) Field of Classification Search
CPC .......... G01J 5/0022; G01J 5/025; G01J 5/045; B62D 55/244; B62D 55/26; B62D 55/32;
(Continued)

(56) References Cited

U.S. PATENT DOCUMENTS 5,507,876 A * 4/1996 Wandres .................. B08B 1/52
134/32
7,963,918 B2 * 6/2011 Park .................... A61B 8/4209
600/407
(Continued)

FOREIGN PATENT DOCUMENTS

CA 3037558 A1 3/2017
CA 2953991 A1 7/2017
(Continued)

OTHER PUBLICATIONS

International Search Report from PCT/CA2022/051236, Dec. 12, 2022, Beatrice Sze.
(Continued)

*Primary Examiner* — Joseph J Dallo
(74) *Attorney, Agent, or Firm* — BCF LLP

(57) ABSTRACT

A system for monitoring at least one physical characteristic of an endless track includes a sensor removably received within the endless track and at least one probe received within the endless track. The sensor is adapted for wireless communication with a receiver. The at least one probe is adapted for operative communication with the sensor, and for detecting the at least one physical characteristic of the endless track and conveying the at least one physical characteristic to be sensed by the sensor. An endless track having a housing embedded in one inner lug is also provided. The housing includes a receptacle received in the inner lug and a lid removably connected to the receptacle for selectively providing access to an interior of the receptacle. The sensor is receivable in the housing. A method for assessing a
(Continued)

secondary physical characteristic of an endless track is also provided.

20 Claims, 22 Drawing Sheets

(51) Int. Cl.

| | |
|---|---|
| ***B62D 55/26*** | (2006.01) |
| ***G01J 5/02*** | (2022.01) |
| ***G01J 5/04*** | (2006.01) |
| *B60R 16/023* | (2006.01) |

(52) U.S. Cl.
CPC ............... *G01J 5/025* (2013.01); *G01J 5/045* (2013.01); *B60R 16/0237* (2013.01); *B60Y 2400/302* (2013.01); *B60Y 2410/10* (2013.01); *B60Y 2410/115* (2013.01)

(58) Field of Classification Search
CPC ................ B62D 55/08; B60R 16/0237; B60Y 2400/302; B60Y 2410/10; B60Y 2410/115; G01M 13/023; G01M 17/03
See application file for complete search history.

(56) References Cited

U.S. PATENT DOCUMENTS

| | | | | |
|---|---|---|---|---|
| 2006/0084868 | A1 * | 4/2006 | Park ..................... | A61B 8/4209 600/437 |
| 2012/0116583 | A1 * | 5/2012 | Beard .................. | B62D 55/202 901/44 |
| 2018/0265145 | A1 | 9/2018 | Todd et al. | |
| 2021/0237570 | A1 | 8/2021 | Kremmer et al. | |

FOREIGN PATENT DOCUMENTS

| | | | | | |
|---|---|---|---|---|---|
| CA | 3088922 | A1 | | 7/2019 | |
| CA | 3054513 | A1 | | 3/2020 | |
| JP | 2018036217 | A | * | 3/2018 | |
| WO | WO-2004064644 | A1 | * | 8/2004 | ............. A61B 8/483 |
| WO | 2020/141084 | A1 | | 7/2020 | |

OTHER PUBLICATIONS

European Search Report from EP22 859 727.4, dated Jun. 5, 2025, reto, Davide.

* cited by examiner

SYSTEM AND METHOD FOR MONITORING AN ENDLESS TRACK OF A TRACK SYSTEM

CROSS-REFERENCE TO RELATED APPLICATION

The present application claims priority to U.S. Provisional Patent Application No. 63/236,741, filed Aug. 25, 2021 entitled "System and Method for Minotoring an Endless Track of a Track System", which is incorporated by reference herein in its entirety.

TECHNOLOGICAL FIELD

The present technology generally relates to systems and methods for monitoring an endless track of a track system.

BACKGROUND

Certain vehicles, such as, for example, agricultural vehicles (e.g., harvesters, combines, tractors, agriculture implement, etc.) and construction vehicles (e.g., bulldozers, front-end loaders, etc.), are used to perform work on ground surfaces that are soft, slippery and/or uneven (e.g., soil, mud, sand, ice, snow, etc.).

Conventionally, such vehicles have had large wheels with tires to move the vehicle along the ground surface. Under some conditions, such tires may have poor traction on some ground surfaces and, as these vehicles are generally heavy, the tires may compact the ground surface in an undesirable way owing to the weight of the vehicle. As an example, when the vehicle is an agricultural vehicle, the tires may compact the soil in such a way as to undesirably inhibit the growth of crops. In order to reduce the aforementioned drawbacks, to increase traction and to distribute the weight of the vehicle over a larger area on the ground surface, track systems were developed to be used in place of at least some of the wheels and tires on the vehicles.

Despite ongoing developments in the field of track systems, there is still room for further improvements for track systems configured to be used on wheeled vehicles. More particularly, there is a desire for improvements related to systems for monitoring the endless track of the track system, and that can, for example, assess the heat generation occurring in the endless track during operation. Heat can be generated in the endless track during operation of the track system as a result of the deformation of the materials forming the endless track, and friction with the ground surface.

Therefore, continued improvements in this area remain desirable.

SUMMARY

It is therefore an object of the present technology to ameliorate the situation with respect to at least one of the inconveniences present in the prior art.

The principles of the present technology are generally embodied in a system for monitoring at least one physical characteristic of an endless track including a sensor removably received within the endless track and at least one probe received within the endless track. The sensor is adapted for wireless communication with a receiver. The receiver is mounted to the vehicle equipped with one or more track systems each having an endless track. The at least one probe is adapted for operative communication with the sensor, and for detecting the at least one physical characteristic of the endless track and conveying the at least one physical characteristic to be sensed by the sensor. The housing includes a receptacle received in an inner lug of the endless track, and a lid is removably connected to the receptacle for selectively providing access to an interior of the receptacle.

The system presents the advantage that the sensor can be inserted and withdrawn from the housing should service or upgrade be desired. An endless track can also be provided with the housing being empty and with the probes already embedded in the endless track. Should the user of such endless track desire to gain the monitoring functionality of the system of the present technology, the user can insert a sensor in the housing and initiate operative communication with a receiver typically supported on the vehicle being equipped with the endless track. Another advantage of the present technology is that the probes embedded in the endless track are capable of spreading heat being generated in the endless track from relatively hot regions to relatively cool regions along the probe. This feature is present regardless a sensor is present or no in the housing.

These advantages and others will be described throughout the present description of the present technology.

In accordance with one aspect of the present technology, there is provided a system for monitoring at least one physical characteristic of an endless track. The system includes a sensor removably received within the endless track, the sensor being adapted for wireless communication with a receiver, and at least one probe received within the endless track, the at least one probe being adapted for operative communication with the sensor, the at least one probe detecting the at least one physical characteristic of the endless track and conveying the at least one physical characteristic to the sensor.

In some embodiments, the operative communication between the at least one probe and the sensor is achieved while the at least one probe is spaced from the sensor.

In some embodiments, the operative communication between the at least one probe and the sensor is achieved by radiation In some embodiments, the radiation includes infrared radiation.

In some embodiments, when in operative communication, a spacing between the at least one probe and the sensor is comprised between 0.5 and 1.5 mm.

In some embodiments, the system further includes a housing received within a cavity defined in the endless track. The housing includes a receptacle structured to receive the sensor and to connect to the at least one probe, and a lid connectable to the receptacle In some embodiments, the system further includes a gasket disposed between the receptacle and the lid, the gasket being resiliently compressed between the receptacle and the lid when the lid is connected to the receptacle.

In some embodiments, the sensor is insertable in the receptacle in a single orientation.

In some embodiments, the lid is connectable to the receptacle in a single orientation.

In some embodiments, at least one of the receptacle and the lid is transparent to wireless communication between the sensor and the receiver In some embodiments, the lid is received in a portion of a lug of the endless track.

In some embodiments, the lid is received in a portion of a drive lug of the endless track that is opposite to a ground engaging surface of the endless track.

In some embodiments, the lid has a top wall, and when the sensor is received in the receptacle and the lid is connected to the housing, the top wall is coplanar with a top wall of the drive lug.

In some embodiments, the sensor includes an electronic circuit board supporting and electrically connecting a power source, a processing unit powered by the power source, at least one temperature sensor powered by the power source and operatively connected to the processing unit, and a wireless communication device powered by the power source and operatively connected to the processing unit, the wireless communication device being wirelessly connectable to the receiver.

In some embodiments, the at least one temperature sensor includes first and second temperature sensors, the first temperature sensor being configured to measure a temperature of the electronic circuit board, and the second temperature sensor being configured to measure a temperature of the at least one probe.

In some embodiments, the at least one temperature sensor further includes a third temperature sensor, the second temperature sensor being disposed on a first side of the electronic circuit board, and the third temperature sensor being disposed on a second side of the electronic circuit board, the second side being opposite the first side In some embodiments, the second temperature sensor faces in a first direction, and the third temperature sensor faces in a second direction.

In some embodiments, the second direction is opposite the first direction.

In some embodiments, the electronic circuit board is insertable into retaining members defined in the receptacle.

In some embodiments, the electronic circuit board is connected to the lid of the housing so as to be insertable in the housing upon connection of the lid to the receptacle.

In some embodiments, the at least one temperature sensor is an infrared sensor.

In some embodiments, the wireless communication device comprises an antenna system located in a central portion of the electronic circuit board.

In some embodiments, the antenna system is located on a first side of the electronic circuit board, and the power source is located on a second side of the electronic circuit board, the first side being opposite the second side.

In some embodiments, the at least one probe is a temperature probe.

In some embodiments, the at least one probe is configured to dissipate heat within the carcass of the endless track.

In some embodiments, the at least one probe has a length over cross section ratio of 6 or less. In some embodiments, the at least one probe has a length over cross section ratio of 5 or less. In some embodiments, the at least one probe has a length over cross section ratio of 4 or less. In some embodiments, the at least one probe has a length over cross section ratio of 3 or less. In some embodiments, the at least one probe has a length over cross section ratio of 2 or less.

In some embodiments, the at least one probe includes a connector for connecting the probe to the housing.

In some embodiments, the connector is a threaded connector.

In some embodiments, the connector is integrally formed with the probe.

In some embodiments, the connector defines a shoulder having an abutment surface, the abutment surface being structured for abutting a connector receiving surface of the housing In some embodiments, the at least one probe has a transmission portion defining a recess facing toward the temperature sensor.

In some embodiments, the at least one probe comprises first and second probes, the first probe providing the sensor with a first temperature conveyed by the first probe, and the second probe providing a second temperature conveyed by the second probe, the sensor being configured to compare the first temperature with the second temperature.

In some embodiments, the first probe extends laterally from the housing toward the first side edge of the endless track, and the second probe extends laterally from the housing toward the second side edge of the endless track.

In some embodiments, the system further includes third and fourth probes extending vertically from the housing toward the ground-engaging surface of the endless track, the third probe providing the sensor with a third temperature conveyed by the third probe, and the fourth probe providing a fourth temperature conveyed by the fourth probe, the sensor comparing the third temperature with the fourth temperature.

In some embodiments, the receiver is mounted to a vehicle having the endless track.

In some embodiments, the receiver compares the at least one physical characteristic of the endless track received from the sensor to a reference map.

In some embodiments, the receiver further compares the at least one physical characteristic of the endless track received from the sensor with at least one of a distance travelled by the endless track, a geolocation of the vehicle, an average speed of the vehicle during a predetermined period, an instant speed of the vehicle, and an inclination of the vehicle.

In some embodiments, the receiver is in communication with a remote processing unit.

A track system including the system as described above is also provided.

There is provided a vehicle including a receiver, and at least one track system as described above.

In accordance with another aspect of the present technology, there is provided an endless track for a track system. The endless track includes an outer ground-engaging surface, an inner surface opposite the ground-engaging surface, first and second side edges, a plurality of traction lugs projecting from the ground-engaging surface, a plurality of inner lugs projecting from the inner surface, a housing embedded in one inner lug of the plurality of inner lugs, the housing including a receptacle received in the one inner lug of the plurality of inner lugs, and a lid removably connected to the receptacle for selectively providing access to an interior of the receptacle, and at least one probe adapted to detect and convey at least one physical characteristic of the endless track, the at least one probe being connected to the housing and extending in at least one of the inner lug of the plurality inner lugs and one traction lug of the plurality of traction lugs.

In some embodiments, the at least one probe includes first and second probes, the first probe extends laterally from the housing toward the first side edge of the endless track, and the second probe extends laterally from the housing toward the second side edge of the endless track.

In some embodiments, the at least one probe further includes third and fourth probes extending vertically from the housing toward the outer ground-engaging surface of the endless track.

In some embodiments, the at least one probe is made of a relatively high thermal conductivity material.

In some embodiments, the at least one probe includes a connector for connecting the at least one probe to the housing.

In some embodiments, the connector is a threaded connector.

In some embodiments, the connector is integral with the at least one probe.

In some embodiments, the connector defines a shoulder having an abutment surface, the abutment surface being structured for abutting a connector receiving surface of the housing.

In some embodiments, the probe has a transmission portion located inside the housing, the transmission portion defining a recess.

In some embodiments, the endless track further includes a sensor received in the housing, the sensor being in operative communication with the at least one probe for sensing the at least one physical characteristic of the endless track.

A track system having the endless track as described above is also provided.

In accordance with yet another aspect of the present technology, there is provided a method for assessing a secondary physical characteristic of an endless track used as a ground-engaging member of a vehicle. The method includes determining a primary physical characteristic of the endless track by at least one probe located within the endless track, conveying the primary physical characteristic to a sensor removably received within the endless track, and communicating the primary physical characteristic from the sensor to a receiver for assessing the secondary physical characteristic.

In some embodiments, the at least one probe includes first and second probes, and the method includes determining a first primary physical characteristic of the endless track using the first probe, conveying the first primary physical characteristic to the sensor, determining a second primary physical characteristic of the endless track using the second probe, conveying the second primary physical characteristic to the sensor, comparing the first and second primary physical characteristic using the sensor to obtain a resulting primary physical characteristic, and communicating the resulting primary physical characteristic to the receiver.

In some embodiments, the method further comprises comparing the primary physical characteristic to a reference map for determining the secondary physical characteristic.

In some embodiments, the receiver assesses the secondary physical characteristic based on the primary physical characteristic and on at least one of an outside temperature, a geolocation of the endless track, an inclination of a terrain travelled by the endless track, a nature of the terrain travelled by the endless track, time of day, weather data, a distance travelled by the endless track, an average speed of the vehicle during a predetermined period, an instant speed of the vehicle, and an inclination of the vehicle.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Should there be any difference in the definitions of term in this application and the definition of these terms in any document included herein by reference, the terms as defined in the present application take precedence.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
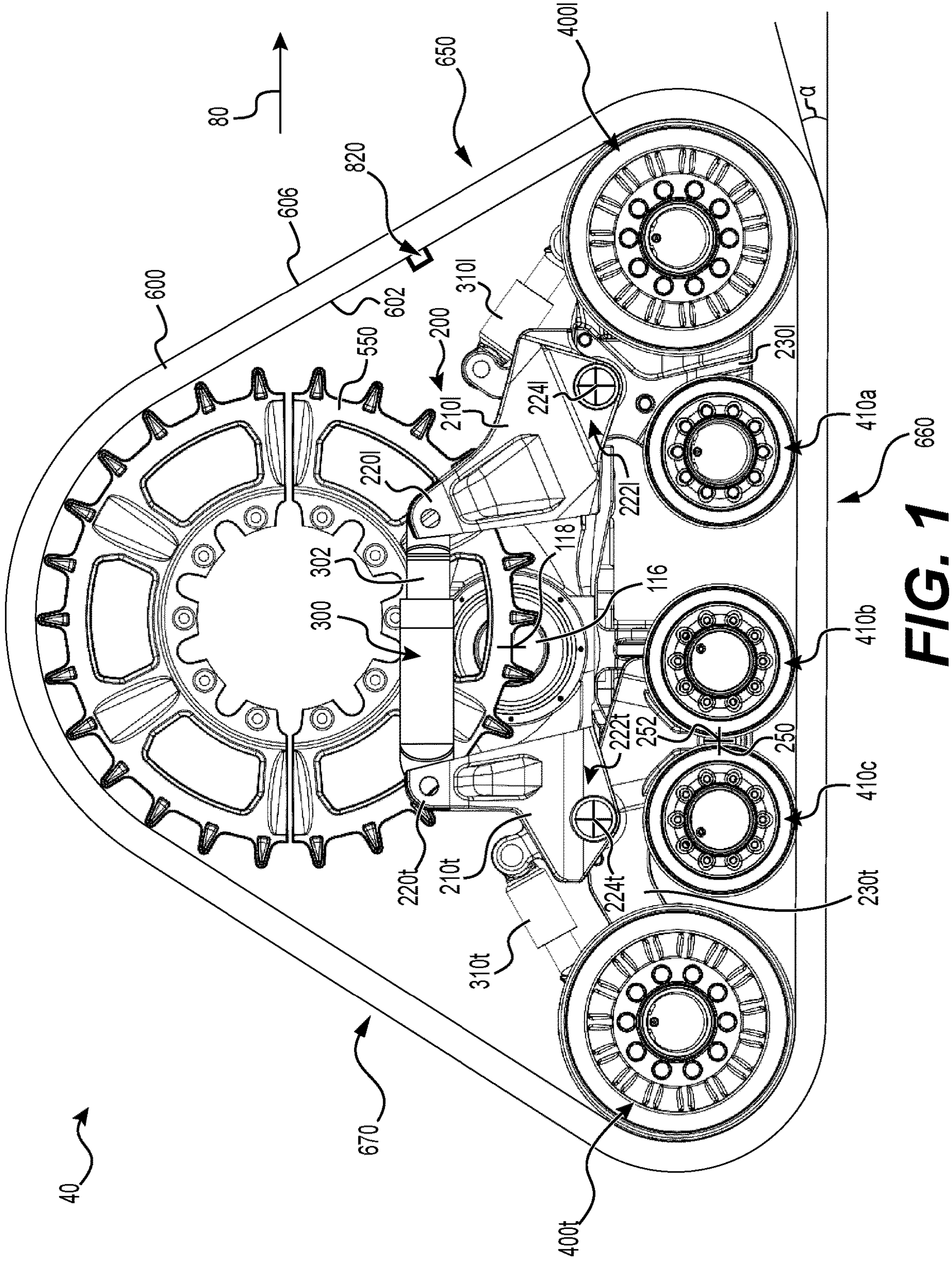
FIG. 1 is a left side elevation view of a track system including a portion of the system for monitoring an endless track in accordance with one embodiment of the present technology, the track system being configured for being operatively connected to a right side of a vehicle.

With reference to FIGS. 4 to 21, an embodiment of the present technology, system 800 for monitoring an endless track, will be described in relation to a track system 40 having an endless track 600. It is to be expressly understood that the system 800 is merely an embodiment of the present technology. Thus, the description thereof that follows is intended to be only a description of illustrative examples of the present technology. This description is not intended to define the scope or set forth the bounds of the present technology. In some cases, what are believed to be helpful examples of modifications or alternatives to the system 800 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 800 may provide in certain aspects a simple embodiment of the present technology, and that where such is the case it has been presented in this manner as an aid to understanding. As persons skilled in the art would understand, various embodiments of the present technology may be of a greater complexity than what is described herein.

The track system 40 is for use with a vehicle 60 (schematically shown in FIGS. 2, 4 and 6, and shown in FIG. 5) having a chassis 62, a drive shaft 68 extending laterally outwardly from the chassis 62 for driving the track system 40. The chassis 62 supports the various components of the vehicle 60. In some embodiments, the vehicle 60 is an agricultural vehicle. However, the track system 40 could be used on different types of vehicles that serve many different functions. In addition, it is contemplated that the track system 40 could be connected otherwise to the chassis 62 of the vehicle 60.

Figure 2:
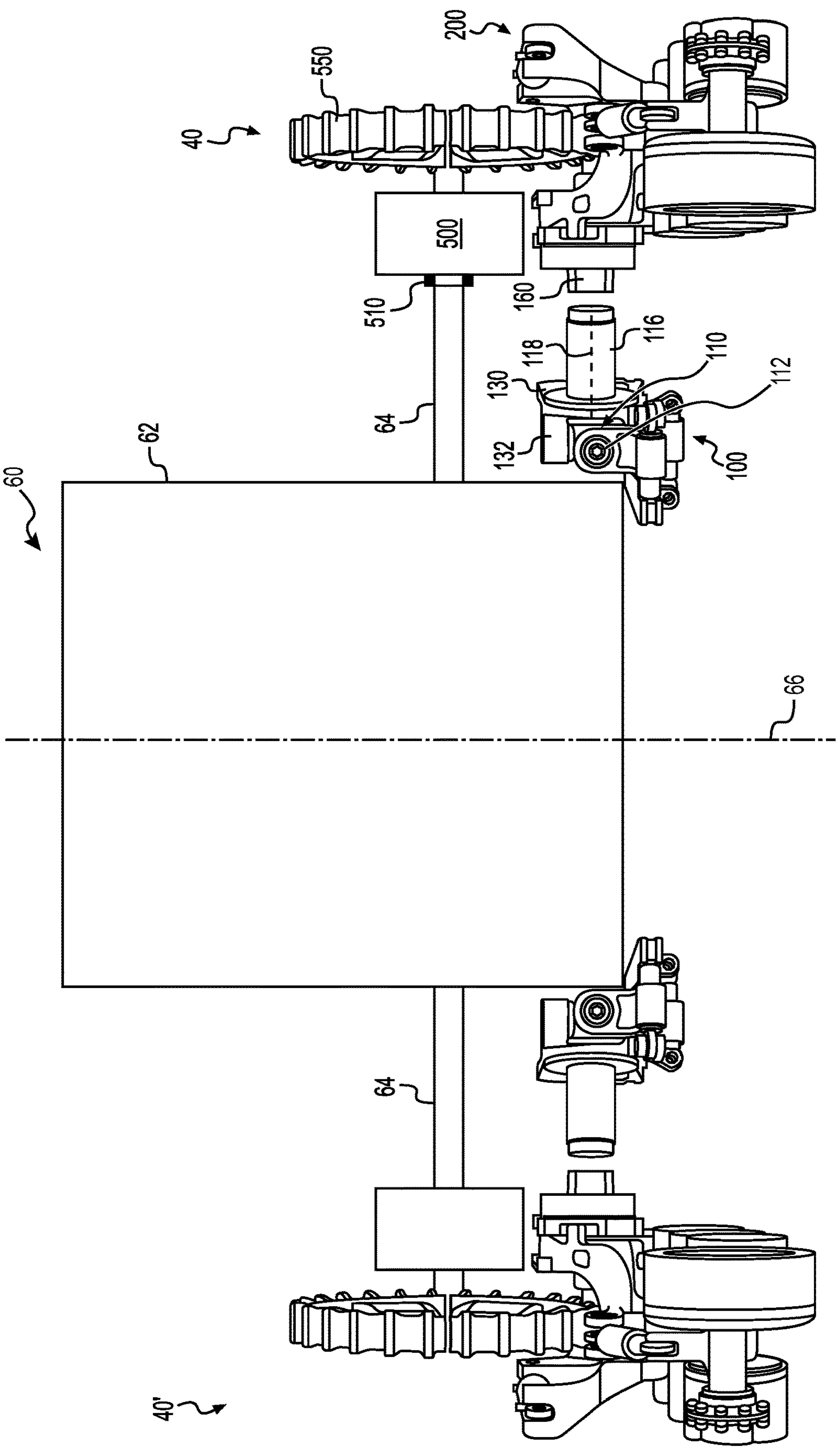
FIG. 2 is a partially exploded, rear elevation view of a vehicle having the track system of FIG. 1 operatively connected to the right side thereof, with the endless track removed, and another track system being a mirror image of the track system of FIG. 1 operatively connected to the left side thereof and with the endless track removed.
Figure 3:
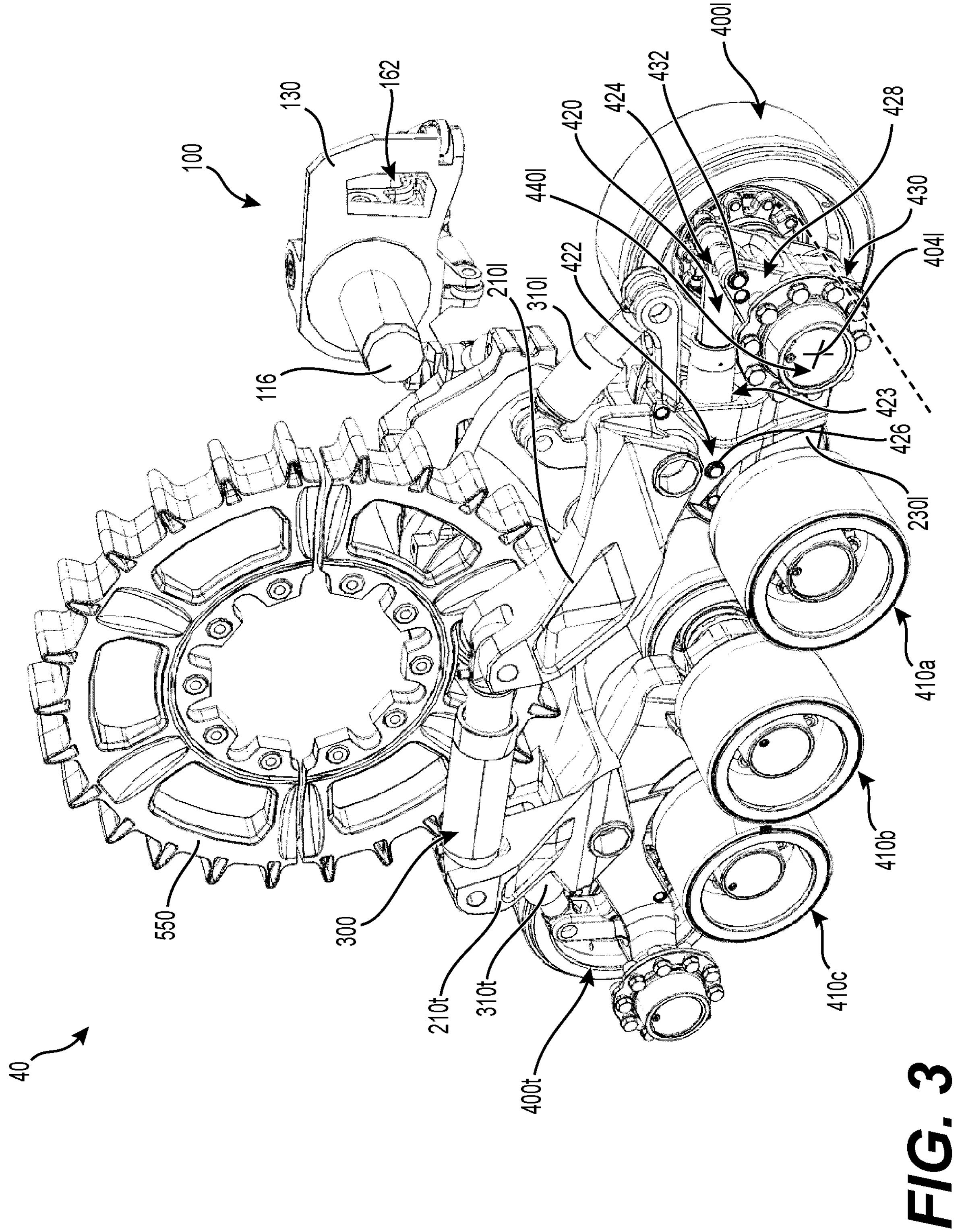
FIG. 3 is a partially exploded, perspective view taken from a front, top, right side of the track system of FIG. 1, with the endless track and one idler wheel of the leading and trailing idler wheel assemblies removed.
Figure 5:
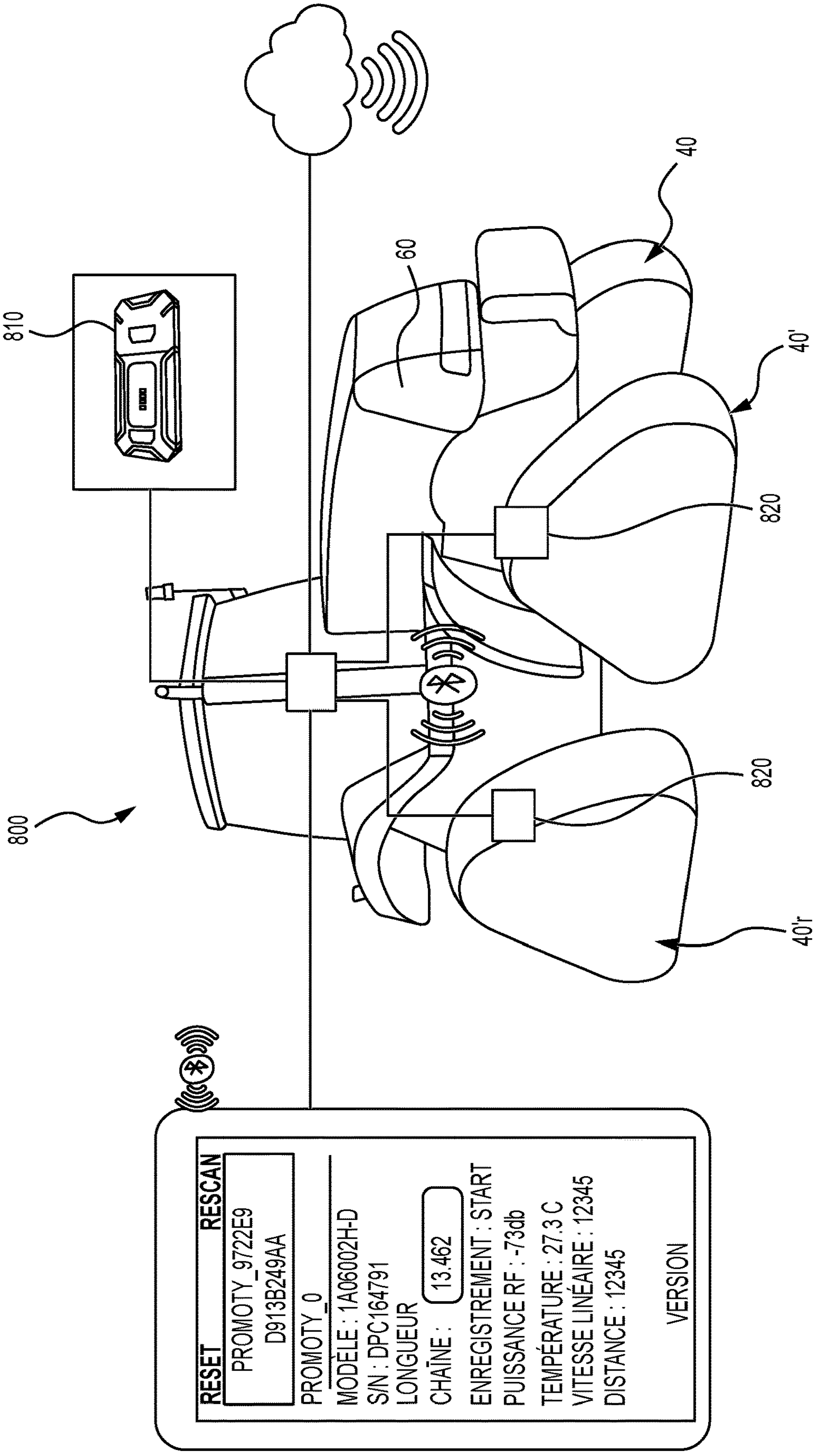
FIG. 5 is a perspective view taken from a front, right side of the vehicle of FIG. 2, with two track systems of FIG. 1 operatively connected to the right side thereof, and with two track systems being a mirror image of the track system of FIG. 1 operatively connected to the right side thereof, with the system for monitoring the endless track of a plurality of track systems operatively connected to the vehicle.
Figure 6:
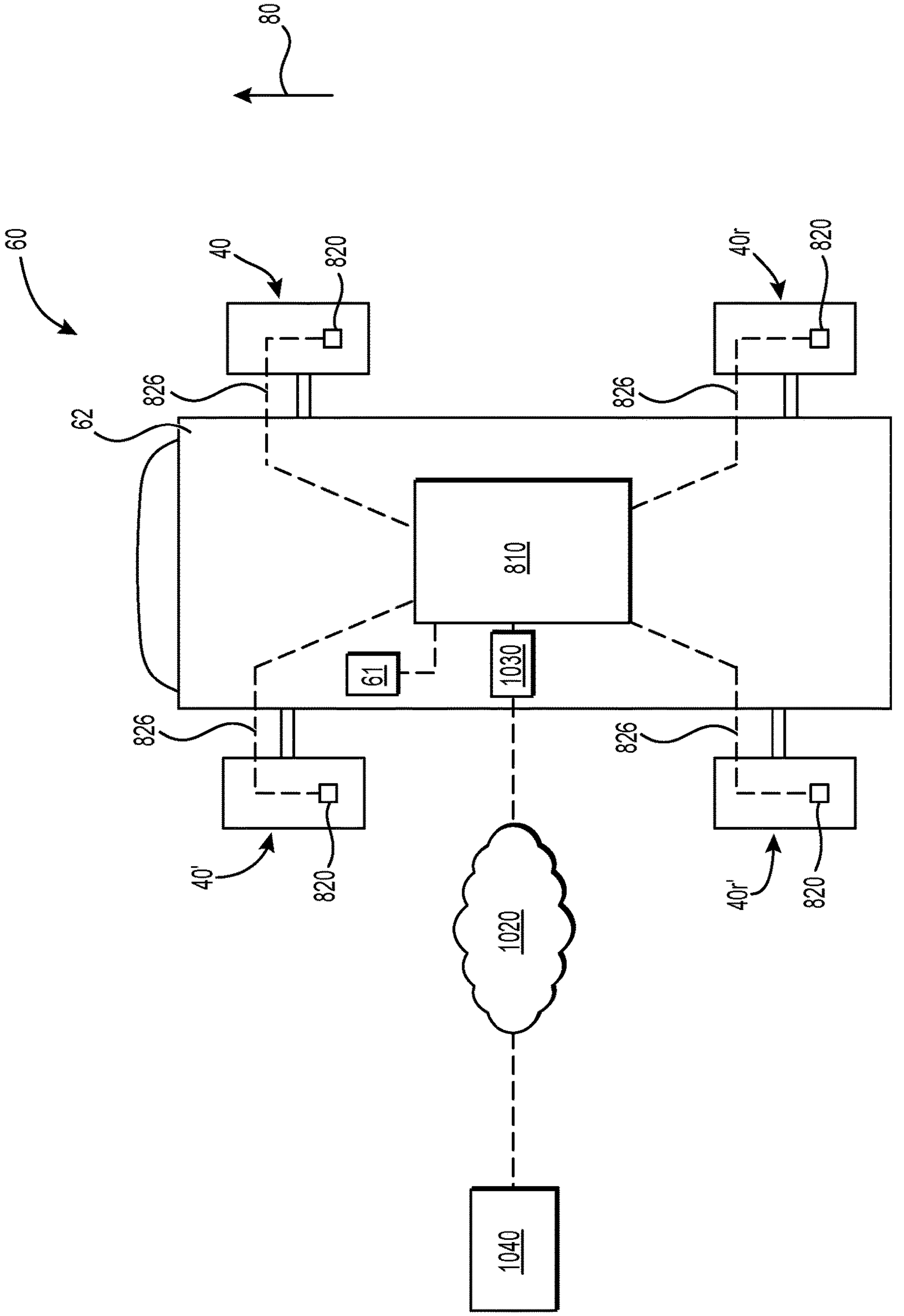
FIG. 6 is a top plan, schematic view of the vehicle of FIG. 5, further including a communication device.

In the present description and referring to FIGS. 5 and 6, the vehicle 60 has four track systems 40, 40', **40*r*, 40*r*' at all four corners. The track system 40' is a mirror image of the track system 40 and is represented in FIGS. 2 and 5. The track systems 40*r*, 40*r*' are similar to the track systems 40, 40' but are connected at the rear of the vehicle 60. It is contemplated that the vehicle 60 could have more or less than four track systems 40 operatively connected thereto, and these track systems can differ from the track system 40** about to be described.

In the context of the following description, "outward" or "outwardly" means away from a longitudinal center plane 66 (FIG. 2) of the chassis 62 of the vehicle 60, and "inward" or "inwardly" means toward the longitudinal center plane 66. In addition, in the context of the following description, "longitudinal" or "longitudinally" means in a direction parallel to the longitudinal center plane 66 of the chassis 62 of the vehicle 60 in a plane parallel to flat level ground, "lateral" or "laterally" means in a direction perpendicular to the longitudinal center plane 66 in a plane parallel to flat level ground, and "vertical" or "vertically" means in a direction perpendicular to the longitudinal center plane 66 along a height direction of the track system 40 in a plane perpendicular to flat level ground. Note that in the Figures, a "+" symbol is used to indicate an axis of rotation or pivot. In the context of the present technology, the term "axis" may be used to indicate an axis of rotation, or the term may refer to a "pivot joint" that includes all the necessary structure (bearing structures, pins, axles and other components) to permit a structure to pivot about such axis, as the case may be.

Figure 4:
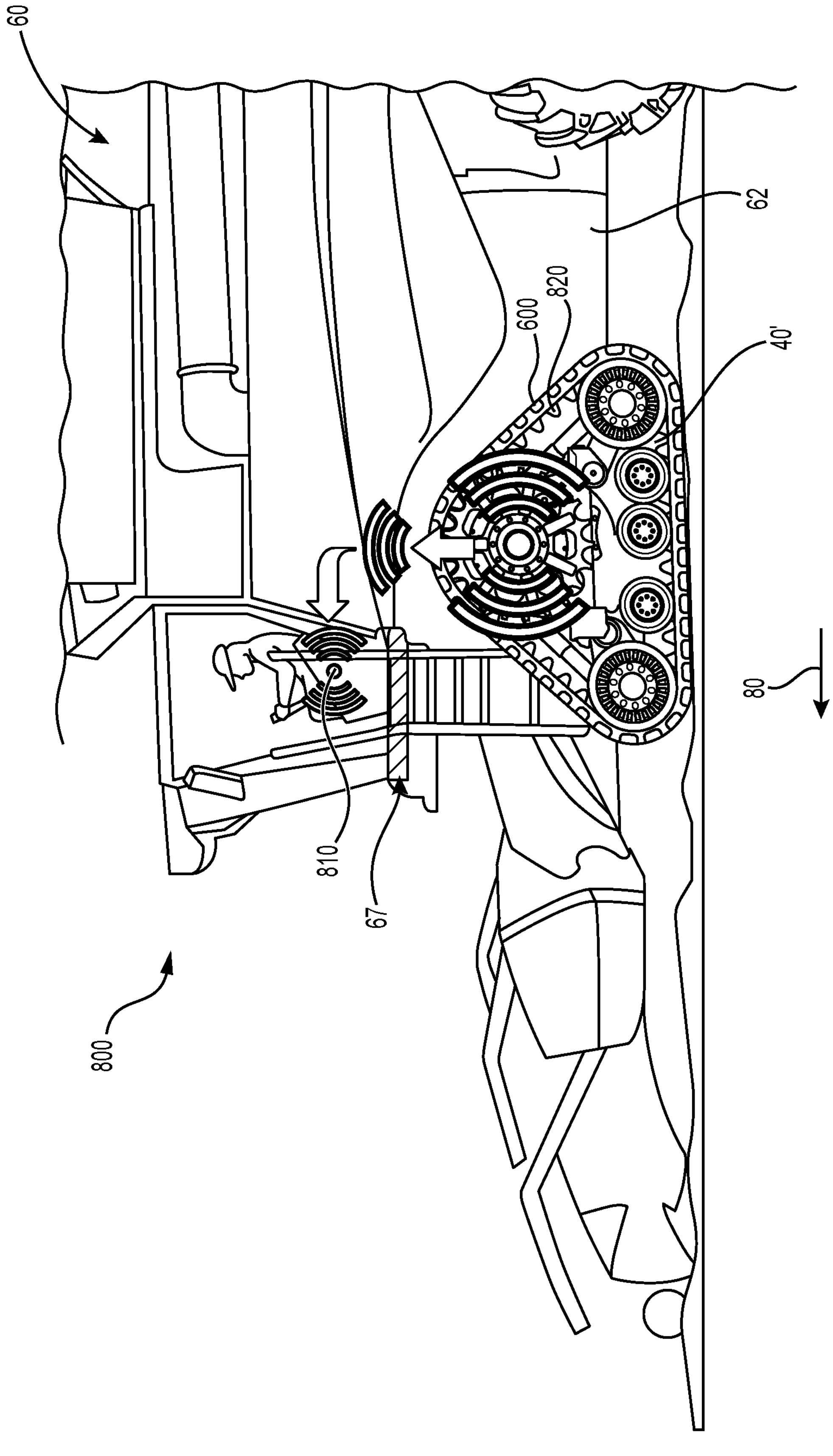
FIG. 4 is a left side elevation view of the vehicle of FIG. 2 with the track system being a mirror image of the track system of FIG. 1 operatively connected to the left side thereof.

Moreover, the direction of forward travel of the track system 40 is indicated by an arrow 80 (FIGS. 1 and 4). In the present description, the "leading" components are identified with an "l" added to their reference numeral (i.e. components towards the front of the vehicle defined consistently with the vehicle's forward direction of travel), and the "trailing" components are identified with a "t" added to their reference numeral (i.e. components towards the rear of the vehicle defined consistently with the vehicle's forward direction of travel). In the following description and accompanying Figures, the track system 40 is configured to be attached to a right side of the chassis 62 of the vehicle 60.

Furthermore, it is to be understood in the present description that a wheel assembly includes one or more wheels, an axle for supporting the one or more wheels, and the components (bearings, seals, etc.) that are necessary for the wheel(s) to rotate. As such, the different wheel assemblies will not be described in great details in the current description.

General Description of the Track System

Referring to FIGS. 1 to 4, the track system 40 will be generally described. The track system 40 includes an attachment assembly 100 connectable to the chassis 62 of the vehicle 60. The track system 40 further includes a frame assembly 200 disposed laterally outwardly from the attachment assembly 100 (FIG. 2) and connected thereto. The frame assembly 200 is a multi-member frame assembly and includes a leading frame member **210*l* pivotably connected to the attachment assembly 100 via pivot 116 for pivoting about the pitch pivot axis 118 (FIG. 1), and a trailing frame member 210*l* pivotably connected to the attachment assembly 100 via the pivot 116 for pivoting about the pitch pivot axis 118 (FIG. 1) independently from the leading frame member 210*l*. The multi-member frame assembly 200 also includes a leading wheel-bearing frame member 230*l* pivotably connected to a lower portion 222*l* of the leading frame member 210*l*. The leading wheel-bearing frame member 230*l* pivots about a pivot axis 224*l*. The multi-member frame assembly 200 further includes a trailing wheel-bearing frame member 230*l* pivotably connected to a lower portion 2221 of the trailing frame member 210. The trailing wheel-bearing frame member 230***l* pivots about a pivot axis 224*l*. A trailing support wheel assembly 250 is pivotably connected to the trailing wheel-bearing frame member 230 about an axis 252. The track system 40 further includes a damper 300 (in this embodiment a shock absorber) interconnecting the leading frame member 210*l* and the trailing frame member 210*t*.

A leading idler wheel assembly 400*l* is rotatably connected to the leading wheel-bearing frame member 230*l*, and a trailing idler wheel assembly 400*l* is rotatably connected to the trailing wheel-bearing frame member 230*l*. A plurality of support wheel assemblies 410*a*, 410*b*, 410*c* are disposed between the leading idler wheel assembly 400*l* and the trailing idler wheel assembly 400*l*. The support wheel assemblies 410*a*, 410*b*, 410*c* assist in distributing the load born by the track system 40 across the endless track 600 of the track system 40. The support wheel assembly 410*a* is rotatably connected to the leading wheel-bearing frame member 230*l*. The support wheel assemblies 410*b*, 410*c* are rotatably connected to the trailing support wheel assembly 250.

Referring to FIGS. 1 to 4, the track system 40 further includes a sprocket wheel 550. It is noted that in the present embodiment, the drive shaft 64 of the vehicle 60 is operatively connected to the sprocket wheel 550. Other embodiments of the track system 40 could be designed to be used on a vehicle and not be meant to be driven by a drive shaft 64. For example, other embodiments of the track system 40 could be configured to be operatively connected to a towed vehicle, and thus such embodiments of the track system 40 would have no sprocket wheel 550. In such embodiments the track system could have a generally rectangular shape instead of the generally triangular shape of the track system 40 illustrated in the accompanying Figures.

Endless Track

Figure 7:
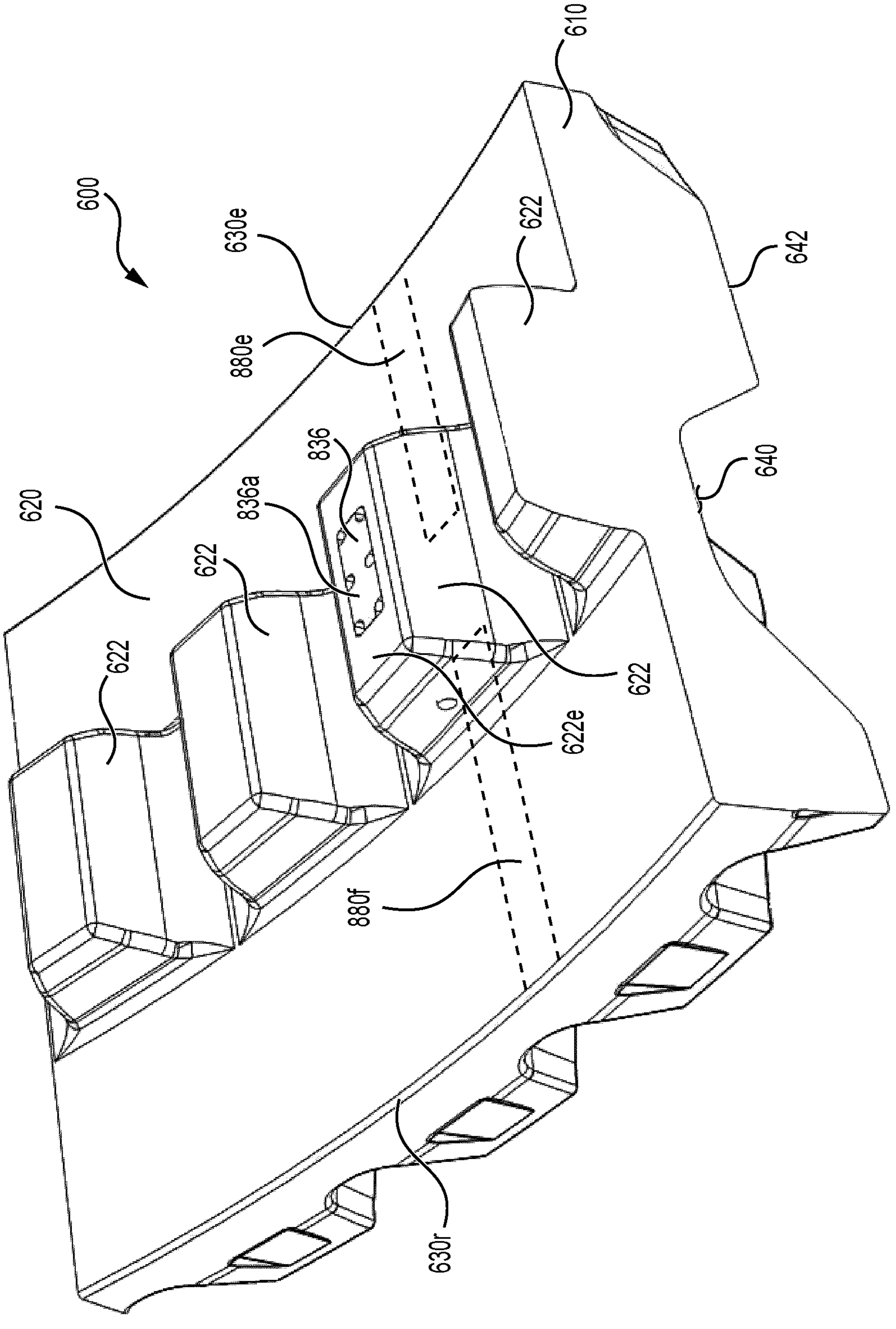
FIG. 7 is a perspective view taken from a top, front, right side of a portion of the endless track of the track system of FIG. 1, the endless track including a portion of the system for monitoring the endless track.

Referring to FIGS. 1, 4 and 7, the endless track 600 will be generally described. The endless track 600 is an endless polymeric track. The endless track 600 has a carcass 610 defining the body of the endless track 600. Reinforcing members (not shown) are embedded in the endless track 600. The endless track 600 has an inner surface 620 engaging the leading idler wheel assembly 400*l*, the trailing idler wheel assembly 400*l*, and the plurality of support wheel assemblies 410*a*, 410*b*, 410*c*. Lugs 622 (FIG. 7) are disposed on a central portion of the inner surface 620 and are engageable by the sprocket wheel 550. As such, the track system 40 is a "positive drive" track system. Friction drive track systems are also contemplated as being an alternative to the present embodiment. The idler and support wheel assemblies 400*l*, 400*t*, 410*a*, 410*b*, 410*c* have laterally spaced-apart wheels (FIG. 3) engaging the inner surface 620 of the endless track 600 on either side of the lugs 622 to prevent the endless track 600 to slide off. The endless track 600 could also include additional lugs in other embodiments, such as guide lugs further preventing the endless track 600 from sliding off the track system 40. The endless track 600 further has a left side edge 630*l* and a right side edge 630*r*.

The endless track 600 also has an outer surface 640 with a tread 642 (FIGS. 7 and 14) selected for ground engagement. The tread 642 varies in different embodiments according to the type of vehicle on which the track system 40 is to be used with and/or the type of ground surface on which the vehicle is destined to travel. It is contemplated that within the scope of the present technology, the endless track 600 may be constructed of a wide variety of materials and structures including metallic components known in track systems.

Referring back to FIG. 1, the endless track 600 has a leading segment 650, a ground engaging segment 660 and a trailing segment 670. As mentioned above, the generally triangular shape of the track system 40 causes the endless track 300 to have the segments 650, 660, 670, but as other configurations of the track system 40 are contemplated, the endless track 600 could have more or less segments in other embodiments.

Turning now to FIGS. 4 to 9, the system 800 will now be generally described. The system 800 includes a receiver 810 mounted to the vehicle 62. The receiver 810 is shown in FIGS. 4 and 5 to be located in the cab 67 of the vehicle 60, but it could be located elsewhere on the vehicle 60. The system 800 further includes one or more sensors 820 in wireless communication with the receiver 810. In FIGS. 5 and 6, the system 800 includes one sensor 820 in each of the track systems 40, 40', 40*r*, 40*r'*. It is contemplated that more than one sensor 820 could be provided in each of the track systems 40, 40', 40*r*, 40*r'*.

Referring to FIGS. 8 to 13, each sensor 820 includes an electronic circuit board 822 removably received inside a corresponding housing 830 embedded within the endless track 600. One or more probes 880 are operatively connected to each sensor 820, and each probe 880 is received within the endless track 600 at a selected location. The location of each probe 880 relative to one another is selected to provide independent measurements and to minimize interference therebetween.

The sensor 820 and the probes 880 are configured to sense at least one physical characteristic of the track 600 at the selected locations and convey the related signal to the receiver 810. The receiver 810 processes the signals received from the one or more sensors 820, and can, in some embodiments, further use other data, such as the geolocation of the vehicle 40, the speed of the vehicle 40, the outside air temperature, etc., to monitor the status of the track system 40 and/or the endless track 600.

In the present embodiment, the system 800 is configured to monitor the temperature of the endless track 600 at selected locations. In the present embodiment, the probes 880 are embedded within the endless track 600 and act as heat conductor. The probes 880 can be embedded within the endless track 600 during the manufacturing process of the endless track 600 or afterwards. The probes 880 are adapted to convey at least some the heat of the endless track 600 to the sensor 820. Each sensor 820 includes a plurality of temperature sensors 850 adapted to measure the temperature of a corresponding probe 880.

The receiver 810 is in wireless communication with the sensors 820 received in a same endless track 600 or in different endless tracks 600 from different track systems 40 operatively connected to the vehicle 60. For example, when two or more sensors 820 are provided in a given endless track 600, the receiver 810 could use the data provided by these sensors 820 for redundancy and assessing reliability of the data. When sensors 820 are provided in different endless tracks 600, for example at all four corners of the vehicle 60, the receiver 810 could use the data provided by these sensors 520 for comparison analysis.

Each component of the system 800 will now be described in more details.

Figure 11:
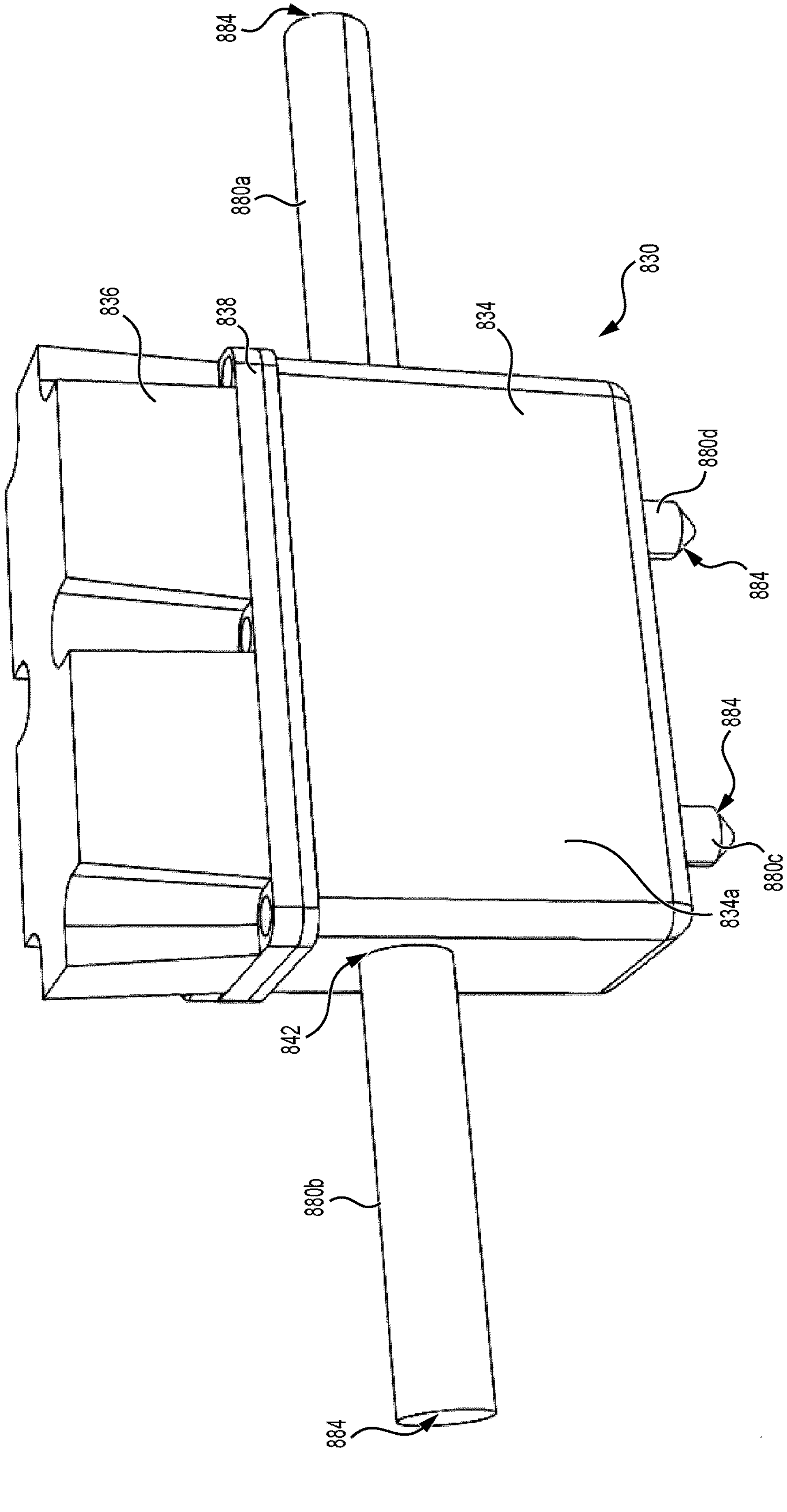
FIG. 11 is a perspective view taken from a front, top, left side of a housing enclosing the components of the system of FIG. 9, with the four probes protruding from the housing.
Figure 12:
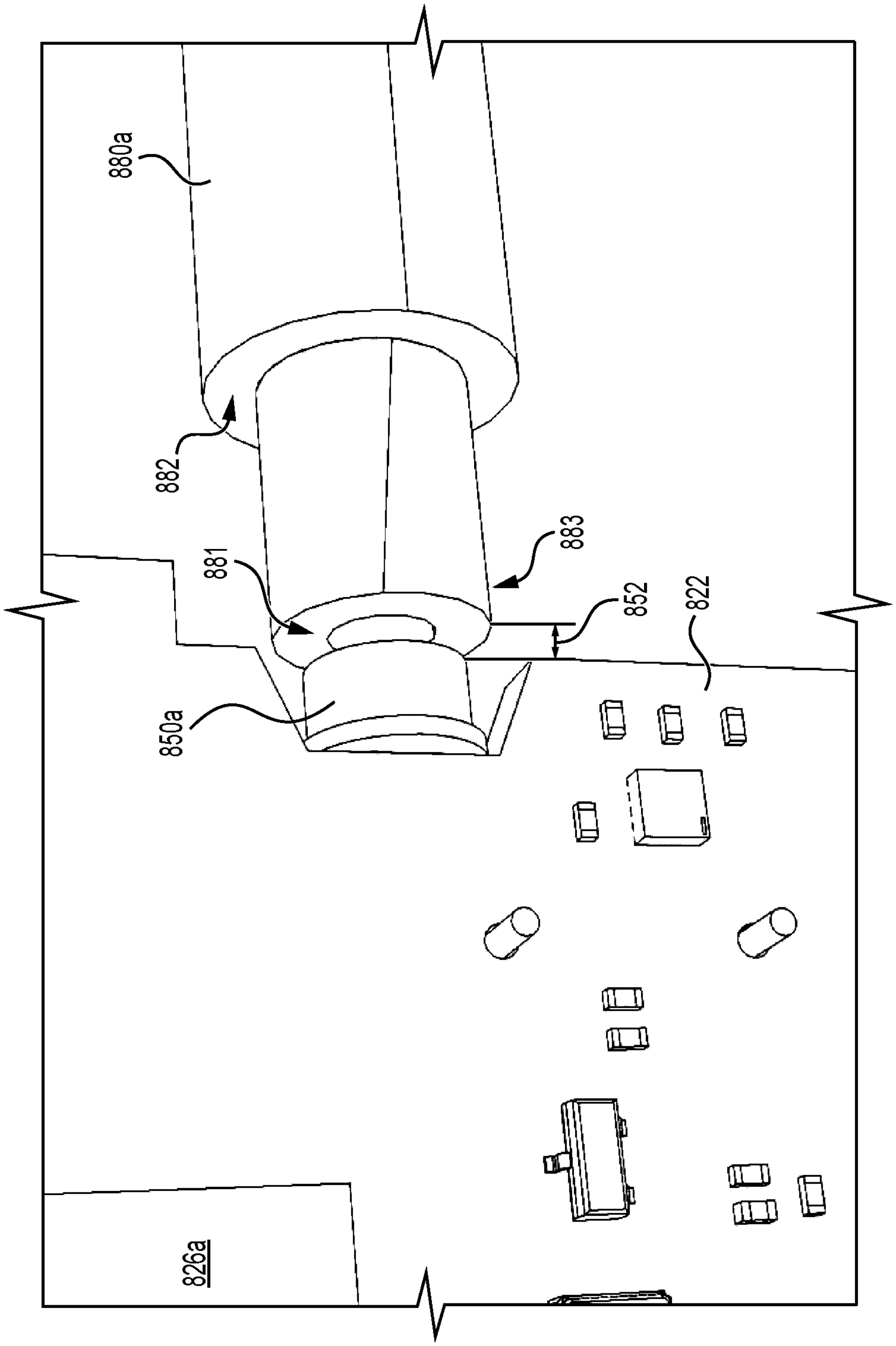
FIG. 12 is a close up view of the sensor and of the right probe of the system of FIG. 9.
Figure 14:
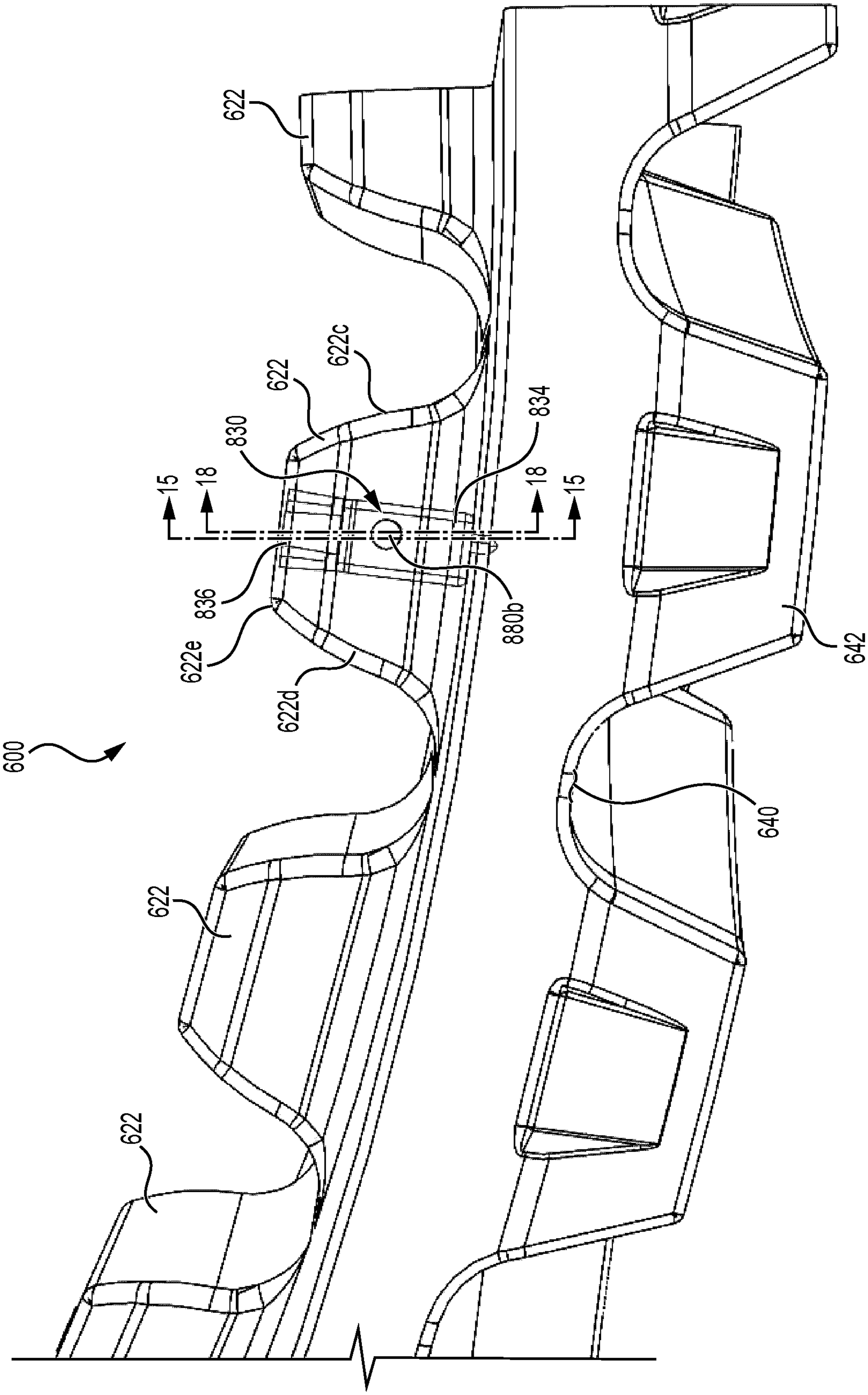
FIG. 14 is a left side elevation view of the portion of the endless track of FIG. 7, with one lug being shown in transparency to illustrate the portion of the system for monitoring the endless track.
Figure 15:
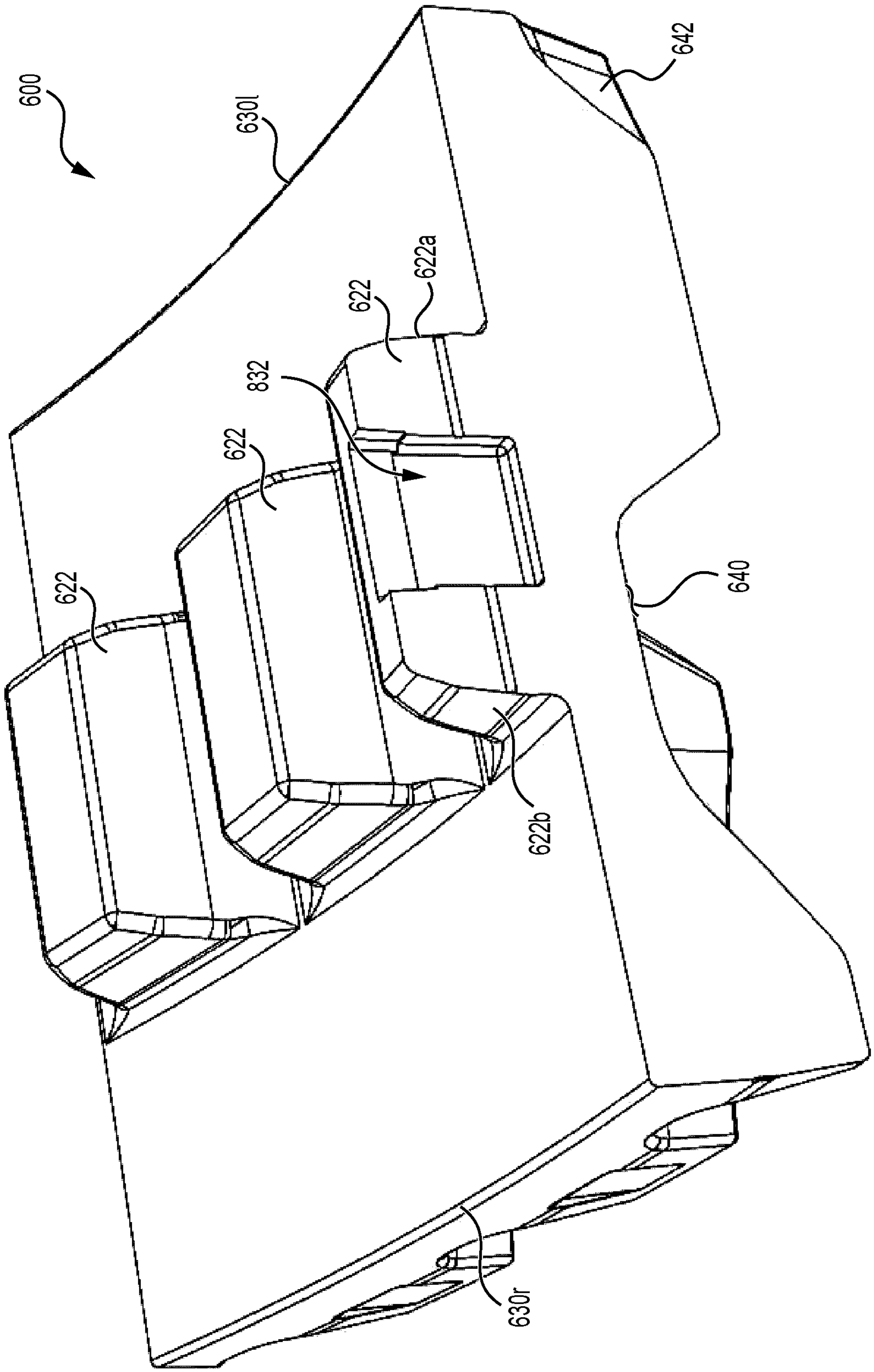
FIG. 15 is a perspective, cross-sectional view of the portion of the endless track of FIG. 14 taken along cross-section line 15-15, with the portion of the system for monitoring the endless track removed.
Figure 16:
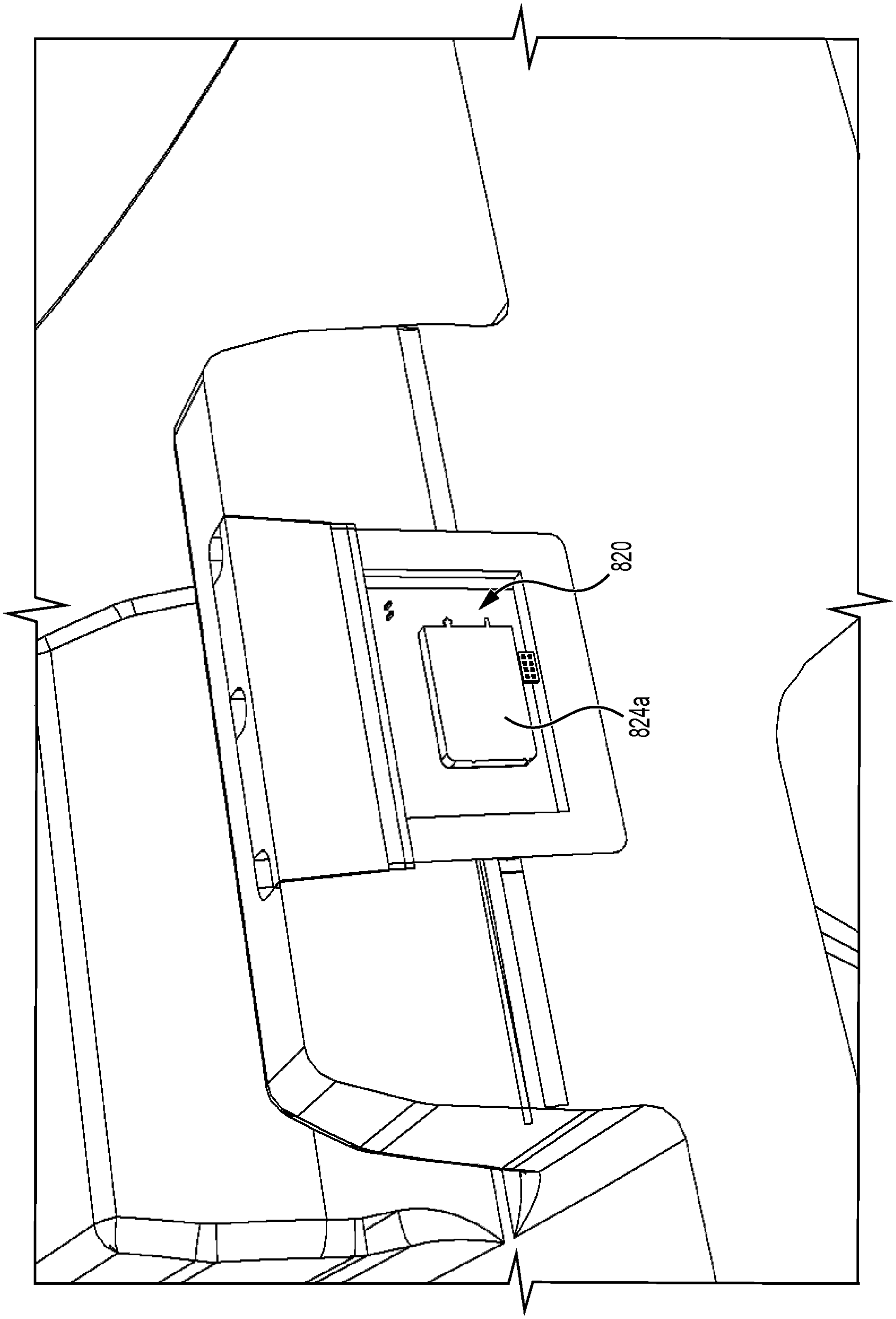
FIG. 16 is a perspective, cross-sectional view of the portion of the endless track of FIG. 14 taken along cross-section line 15-15.

Referring to FIGS. 11, 14 and 15, the housing 830 is shaped and structured to be received in a cavity 832 defined in the endless track 600. In the present embodiment, the cavity 832 is defined in one of the lugs 622 of the endless track 600. More particularly, the cavity 832 extends vertically within the lug 622. In other words, the cavity 832 is a prismatic bore hole extending vertically in the lug 622 and shaped to closely correspond to the outer shape of the housing 830 of the system 800. The cavity 832 could have another shape and/or configuration in other embodiments.

The housing 830 is shaped to fit closely in the cavity 832. The housing 830 includes a receptacle 834 in which one of the sensors 820 is receivable. A lid 836 is removably connectable to the receptacle 834 for selectively allowing access to the inside of the housing 830. The housing 830 has a length, a height and a depth selected to fit completely between the left and right side walls 622*a*, 622*b*, front wall 622*c*, back wall 622*d*, and top wall 622*e* of the lug 622 of the endless track 600 defining the cavity 832 (FIGS. 14 and 15). The receptacle 834 is bonded to the endless track 600 within the cavity 832. In another embodiment, the receptacle 834 could be embedded within the endless track 600 during the manufacturing process thereof.

The housing 830 is made of materials that are transparent to radio waves such that wireless communication between the sensor 820 and the receiver 810 is not impaired or interfered by the materials forming the housing 830. Examples of such materials include, and are not limited to, fiberglass reinforced polymeric materials. In some implementations, an outer surface 834*a* (FIG. 11) of the receptacle 834 is bonded to the surface of the endless track 600 defining the cavity 832 using an adhesive to secure the receptacle 834 to the endless track 600.

Figure 17:
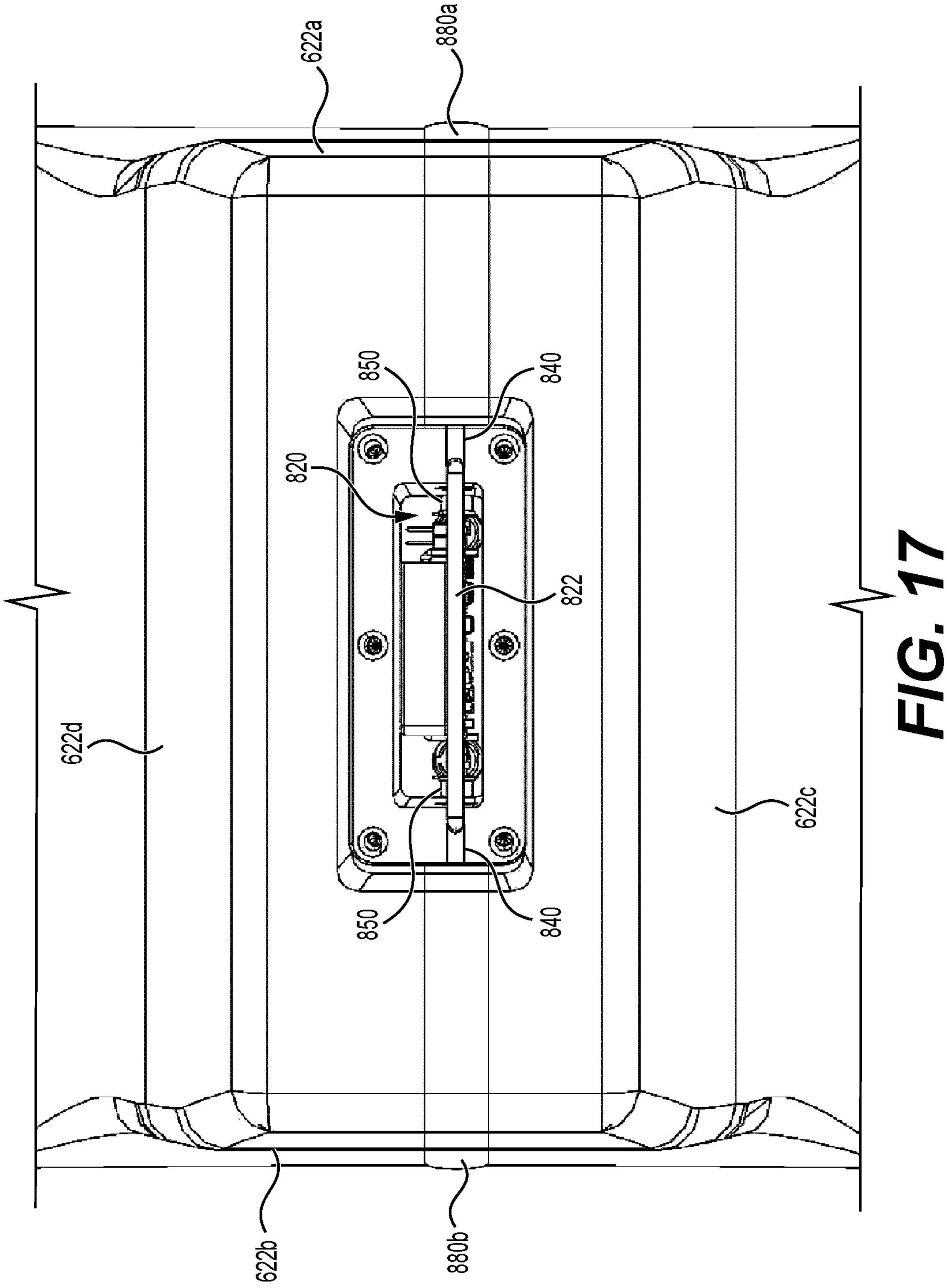
FIG. 17 is a top plan view of the portion of the endless track of FIG. 7, with a lid of the portion of the system for monitoring the endless track omitted.

Referring to FIG. 17, the receptacle 834 has retaining members 840 extending inside the receptacle 834 for retaining and securing the sensor 820 when received inside the receptacle 834. In the present embodiment, the securing members 840 are configured to allow the insertion of the sensor 820 inside the receptacle 834 in a single orientation, thereby preventing a user from inserting the sensor 820 inside the receptacle 834 in an incorrect manner. Moreover, the securing members 840 maintain the sensor 820 in place inside the receptacle 834 when the track system 40 is in operation.

Referring to FIGS. 9, 11, 18 and 19, the receptacle 834 defines connector receiving surfaces 842 at the location where the probes 880 connect to the housing 830. Each one of the probes 880 defines a shoulder 882 that can abut the receiving surface 842. When the shoulder 882 of the probe 880 abut the corresponding receiving surface 842 of the housing 830, the probe 880 extends within the receptacle 834 by a predetermined amount. A spacing 852 (FIG. 12) is defined between each probe 880 and the corresponding temperature sensor 850. In the present embodiment, the spacing 852 between each probe 880 and the corresponding temperature sensor 850 is the same, facilitating the calibration of the sensor 820. It is to be appreciated that the operative communication between each probe 880 and the corresponding temperature sensor 850 is achieved without physical contact between the probe 880 and the temperature sensor 850.

Figure 8:
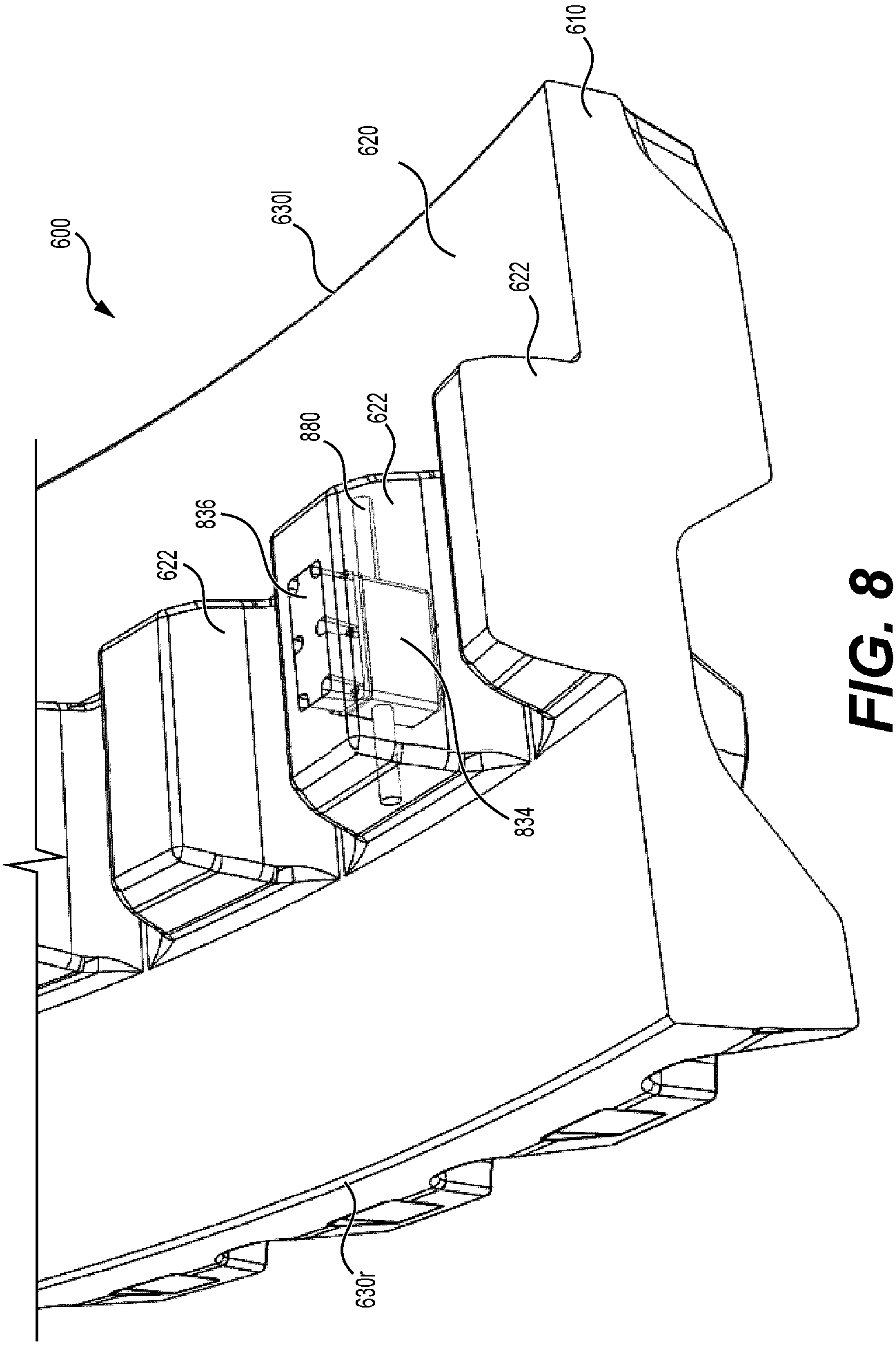
FIG. 8 is a perspective view taken from a top, front, right side of the portion of endless track of FIG. 7, with one lug being shown in transparency to illustrate the portion of the system for monitoring the endless track.
Figure 9:
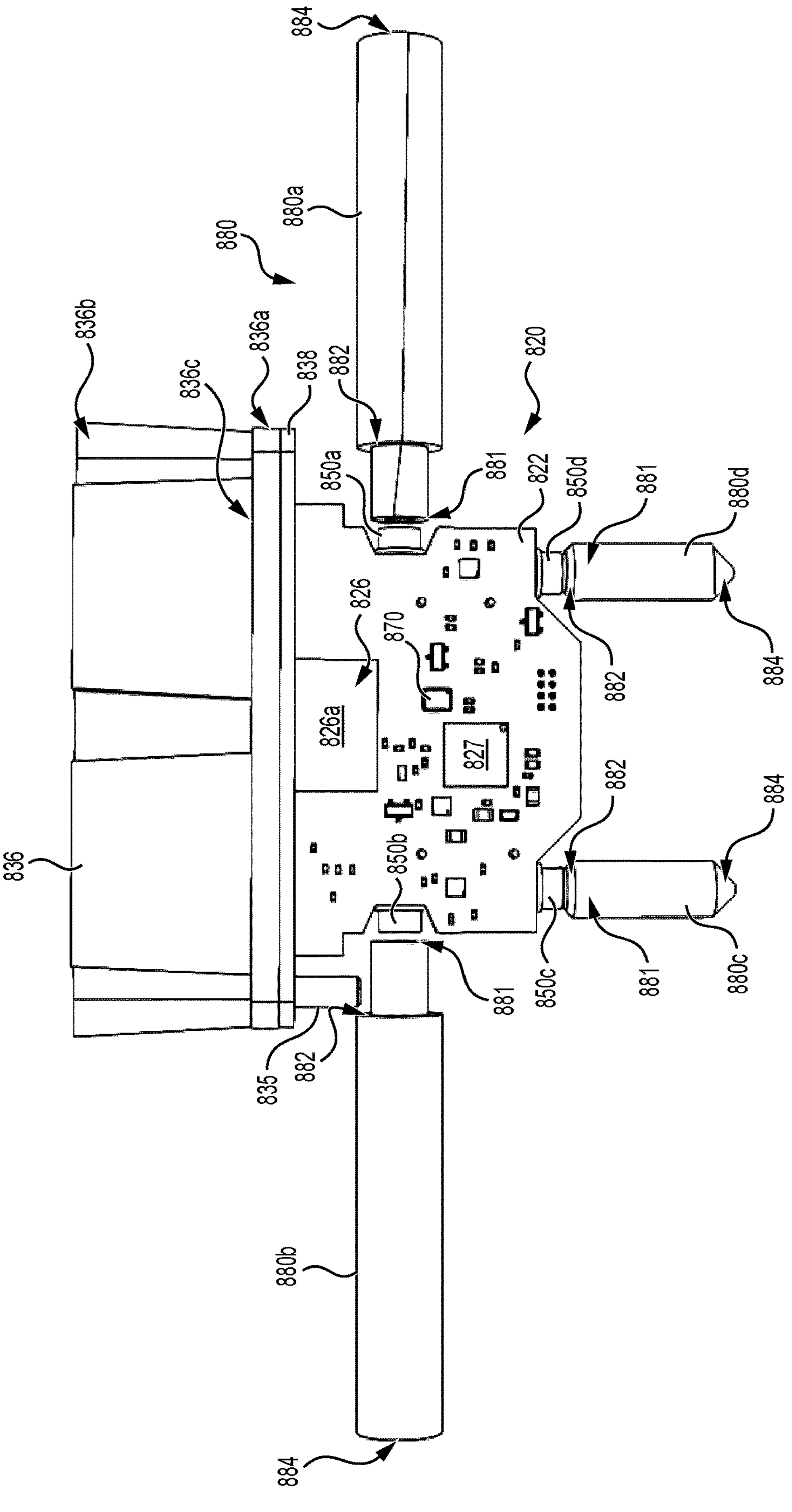
FIG. 9 is front elevation view of a sensor and four probes of the system for monitoring the endless track.
Figure 10:
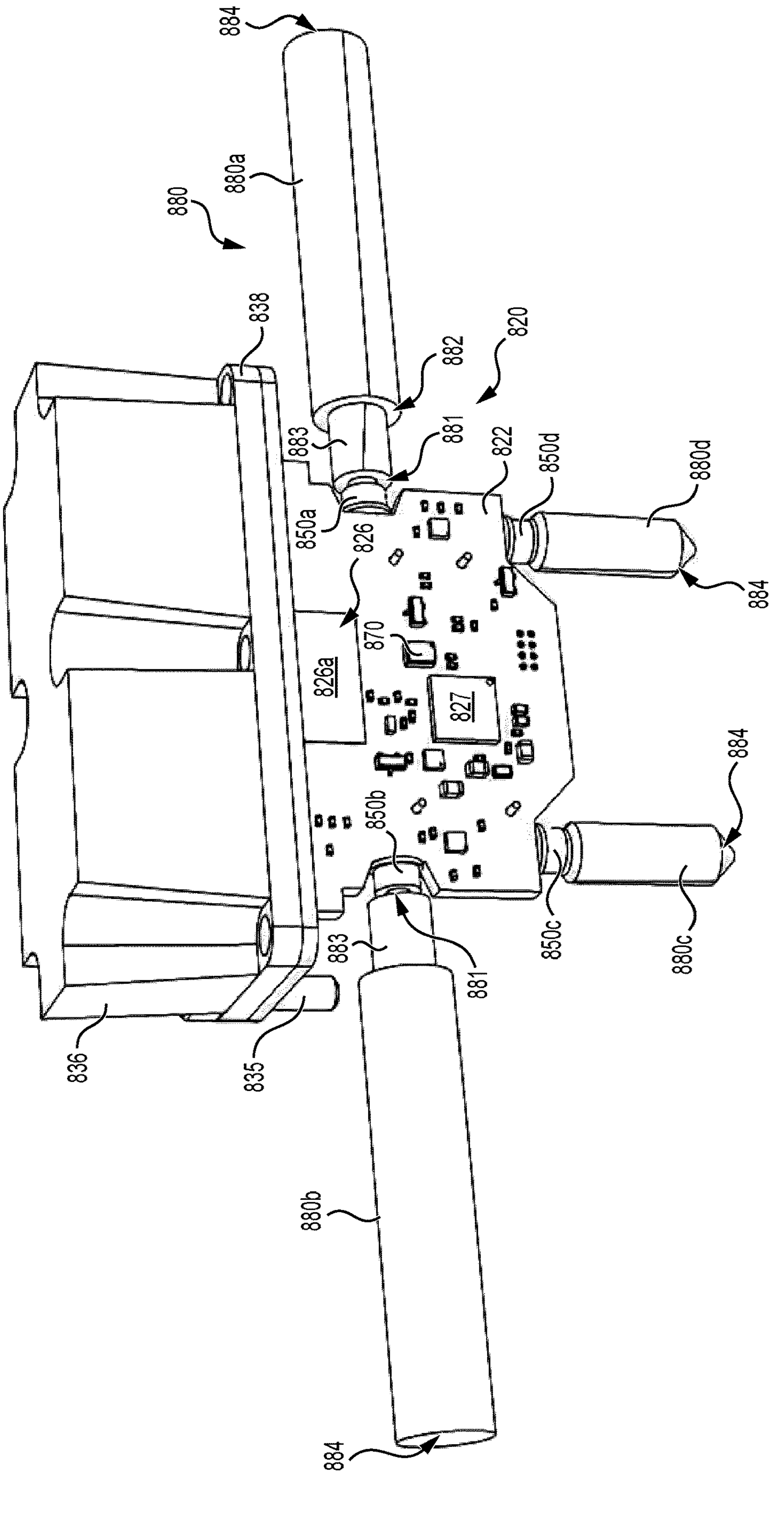
FIG. 10 is a perspective view taken from a front, top, left side of the components of the system of FIG. 9.
Figure 13:
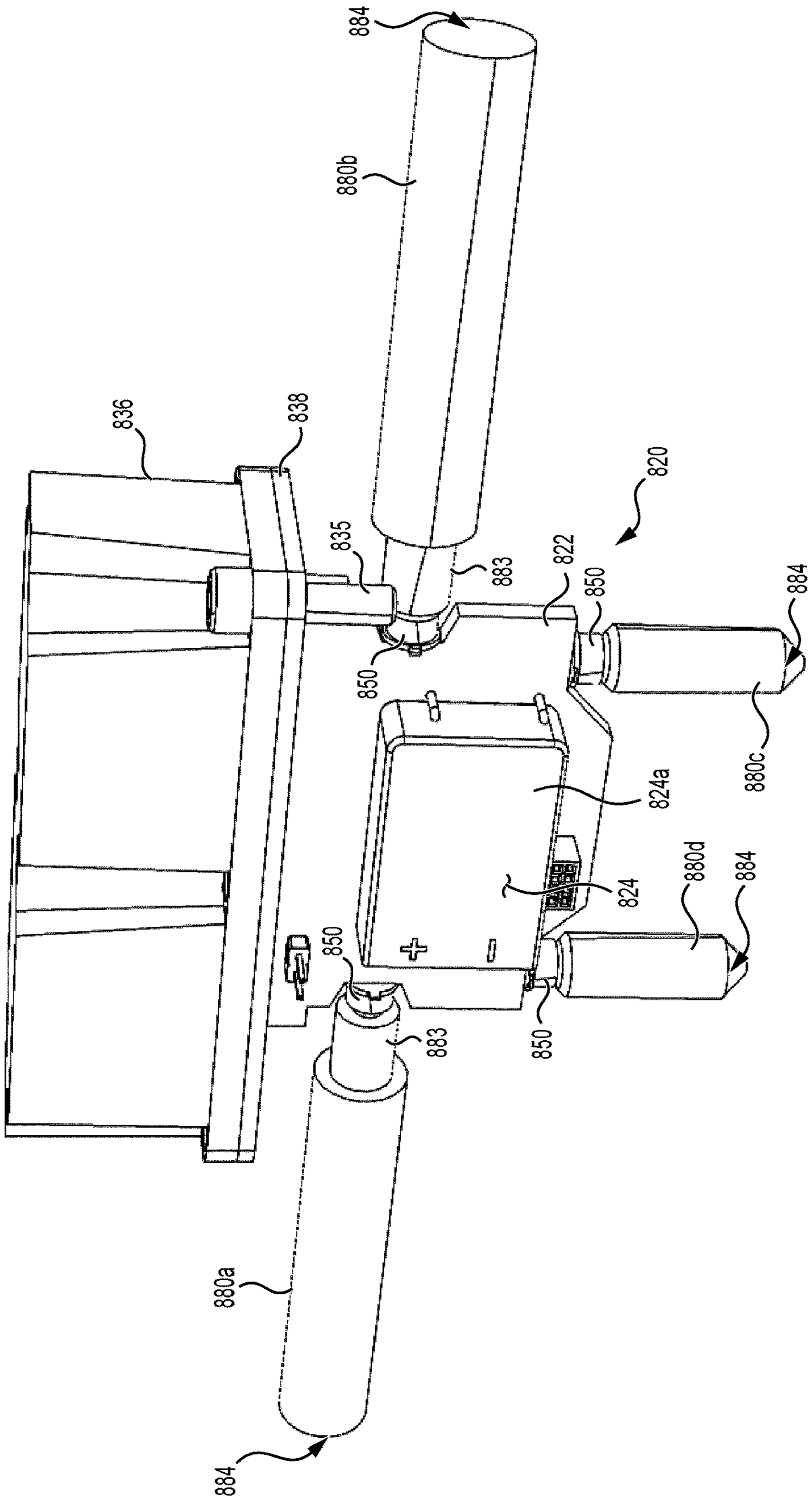
FIG. 13 is a perspective view taken from a rear, top, left side of the components of the system of FIG. 9.
Figure 20:
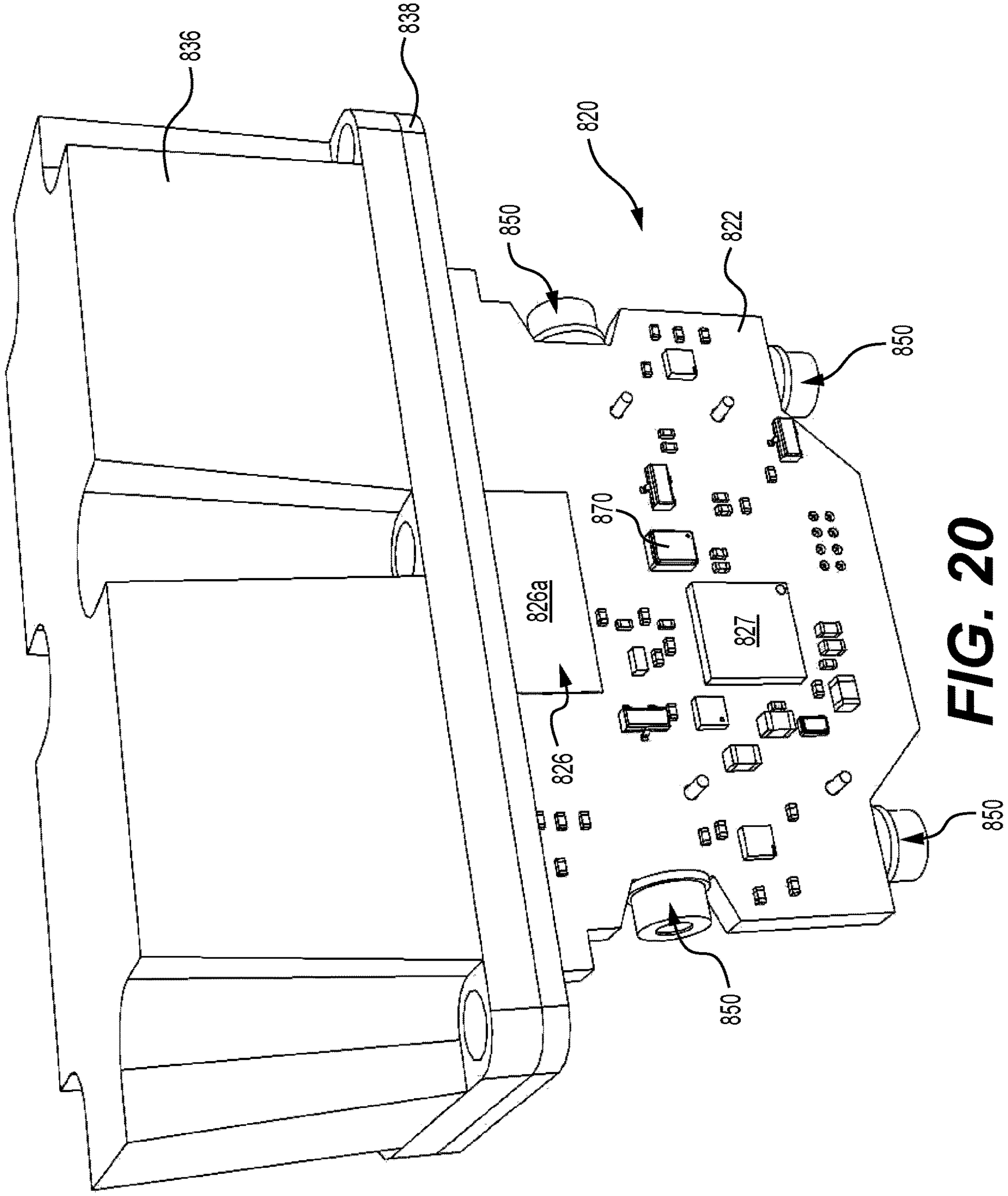
FIG. 20 is a perspective view taken from a front, top, left side of a sensor of the system for monitoring the endless track.

Referring to FIGS. 9 to 13 and 20, the lid 836 is connectable to the receptacle 834 via six fasteners 835 (only one is shown in FIGS. 9, 10 and 13). In the present embodiment, the lid 836 supports the sensor 820 as best seen in FIG. 20. The sensor 820 is thus insertable in the receptacle 834 by handling the lid 836 and by inserting the sensor 820 in the retaining members 840. To ensure that the sensor 820 is inserted in the receptacle 834 is in correct manner, the lid 836 is connectable to the receptacle 834 in a single orientation such that a user cannot insert the sensor 820 in a incorrect manner inside the receptacle 834. The lid 836 is also made of materials that are transparent to radiowaves (ex. fiberglass reinforced composite material and rubber-based materials). As best seen in FIGS. 7 and 8, when connected to the receptacle 834, a top wall 836*a* of the lid 836 is coplanar with the top wall 622*e* of the lug 622 in which the housing 830 is received. Referring to FIG. 9, the lid 836 has a lower portion 836*a* and an upper portion 836*b*. The lower portion 836*a* is relatively stiff compared to the upper portion 836*b*, and the upper portion 836*b* is relatively soft compared to the lower portion 836*a*. The lower and upper portions 836*a*, 836*b* are vulcanized together at interface 836*c*. The relatively soft upper portion 836*b* absorbs shocks and can mitigate the stresses applied to the receptacle 834 by debris or particles that could become stuck between the lugg 622 and the sprocket wheel 550.

It is contemplated that, in some embodiments, the endless track 600 could have one or more distinctive lug 622 with the cavity 832 defined therein and adapted for receiving the housing 830 therein. The distinctive lug 622 would be of a different shape and size from the other lugs 622 to be subjected to driving efforts by the sprocket wheel 550 of lower magnitude compared to the other lugs in order to reduce stress applied to the housing 830.

The housing 830 further includes a gasket 838 (FIG. 9) connected to the lid 836. The gasket 838 is shaped and configured for being resiliently compressed between the receptacle 834 and the relatively stiff lower portion 836*a* of the lid 836 to prevent egress of water or debris inside the receptacle 834. The gasket 838 is made of a resilient polymeric material. In another embodiment, there is no gasket connected to the lid 836, but a portion of the endless track 600 defines a lip protruding in the cavity 832 above the receptacle 834, and when the lid 836 is connected to the receptacle 834, the lip is pinched between the receptacle 834 and the lid 836, thus forming a gasket therebetween.

Referring now to FIGS. 9 to 13, the sensor 820 will be described in more details. As mentioned with reference to FIG. 20, the sensor 820 is connected to the lid 836 for facilitating insertion and withdrawal in and out from the receptacle 834 of the housing 830. The sensor 820 includes the electronic circuit board 822 supporting and interconnecting various components. A power source 824 in the form of a battery pack 824*a* is connected to a back side of the electronic circuit board 822. In the present embodiment, the battery pack 824*a* is bonded to the electronic circuit board 822, but it could be connected thereto otherwise in other embodiments, such as using fasteners or clips. Having the battery pack 824*a* bonded to the electronic circuit board 822 provides the benefits of reducing the size of the packaging while increasing the capacity of the battery pack 824*a*. In the present embodiment, the battery pack 824*a* is selected to provide power to the sensor 820 for about 3,000 hours of operation, or last about 5 years depending on various conditions.

The sensor 820 further includes a wireless communication device 826 including an antenna system 826*a* connected to a front side of the electronic circuit board 822, opposite the battery pack 824*a*. The wireless communication device 826 is configured for providing wireless communication between the receiver 810 supported on the vehicle 60 and the sensor 820. In the present embodiment, the wireless communication device 826 uses BLUETOOTH™ communication protocol with the receiver 810. It is also contemplated that the wireless communication between the receiver 810 and the sensor 820 could be encrypted in some embodiments. The wireless communication device 826 provides two-way communications between the receiver 810 and the sensor 820, and thus firmware updates and calibration instructions can be provided from the receiver 810 to the sensor 820. It is to be noted that having the antenna system **826*a* disposed on the side of the electronic circuit board 822 opposite the battery pack 824*a* improves the reliability of the wireless communication between the sensor 820 and the receiver 810** at least in some circumstances.

Still referring to FIGS. 9 to 13, a processing unit 827, including a microprocessor and a memory, is further connected to the front side of the electronic circuit board 822. The processing unit 827 is operatively connected to the temperature sensors 850, to the battery pack **824*a*, the processing unit 827 and the communication device 826. The processing unit 827 has the capability of counting time, receiving and treating signals from the temperature sensors 850, and formatting these signals for wirelessly communicating them to the receiver 810 via the antenna system 826*a***.

The sensor 820 includes four temperature sensors 850 operatively connected to the electronic circuit board 822, the processing unit 827 and the power source 824. In the present embodiment, the temperature sensors 850 are infrared temperature sensors, but they could be other types of temperature sensors (such as thermocouples) in other embodiments. The temperature sensors 850 include a left facing temperature sensor **850*a*, a right facing temperature sensor 850*b*, and two downward facing temperature sensors 850*c*, 850*d*. Each of the temperature sensors 850*a*, 850*b*, 850*c*, 850*d* has a corresponding probe 880*a*, 880*b*, 880*c*, 880*d* respectively. Each sensor is spaced from the corresponding probe by the spacing 852 mentioned above. The spacing 852 ranges between 0.5 and 1.5 mm, but could be otherwise in other embodiments. The selection of the spacing 852 is based on different factors, such as the characteristics of the temperature sensor 850 and the corresponding probe 880. The configuration of the probes 880*a*, 880*b*, 880*c*, 880*d*** will be described below.

Another temperature sensor 870 is operatively connected to the electronic circuit board 822, to the processing unit 827 and to the power source 824. The temperature sensor 870 is configured to monitor the temperature of the electronic circuit board 822. The temperature sensor 870 can also be used to monitor the temperature inside the receptacle 830 and can be used by the processing unit 827 to calibrate the temperature sensors 850.

As mentioned above, the sensor 820 is removably received within the housing 830. Thus, should the sensor 820 need servicing, replacement, or be upgraded to a newer version, a user can remove the sensor 820 from the housing 830 and replace it with another sensor 820. Furthermore, the system 800 offers the flexibility to a user of upgrading an existing endless track 600 equipped with the housing 830 by inserting a sensor 820 therein. This is convenient for a user since the endless track 600 does not have to be replaced or modified to gain the functionality offered by the system 800. In addition, since the sensor 820 is removably insertable in the endless track 600, the sensor 820 is not subjected to the manufacturing process of the endless track 600, which typically involves curing at high temperatures that could damage the sensor 820.

It is also contemplated that the system 800 could have additional components. Load cells could be mounted to the receptacle 834 and operatively connected to the sensor 820 to assess the load and strain applied to the housing 830, and assist in assessing whether the lug 622 of the endless track 600 in which the housing 830 is disposed is adequately driven by the sprocket wheel 550. If the load cells detect a load or a strain that is outside of a predetermined range, this could be an indication that the sprocket wheel 550 has pitching issues when driving the endless track 600.

Referring to FIGS. 9 to 13 and 21, the probes 880 will now be described. The probes **880*a*, 880*b* extend laterally toward the left side edge 630*l* and the right side edge 630*r* of the endless track 600 respectively, and the probes 880*c*, 880*d* extend vertically toward the carcass 610 of the endless track 600. Each one of the probes 880*a*, 880*b*, 880*c*, 880*d* has a proximal end 881, the shoulder 882, and a connector 883. The connector 883 is adapted for connecting the probe 880*a*, 880*b*, 880*c*, 880*d* to the housing 834. The connector 883, although not shown, is a threaded connector adapted to mate with threads defined in the side walls of the housing 834. The connector 883 is integrally formed with the probe 880. It is contemplated that the connector 883 could be differ in other embodiments. As mentioned above, the shoulder 882 permits precise positioning of the proximal end 881 relative to the corresponding temperature sensor 850*a*, 850*b*, 850*c*, 850*d***.

Figure 18:
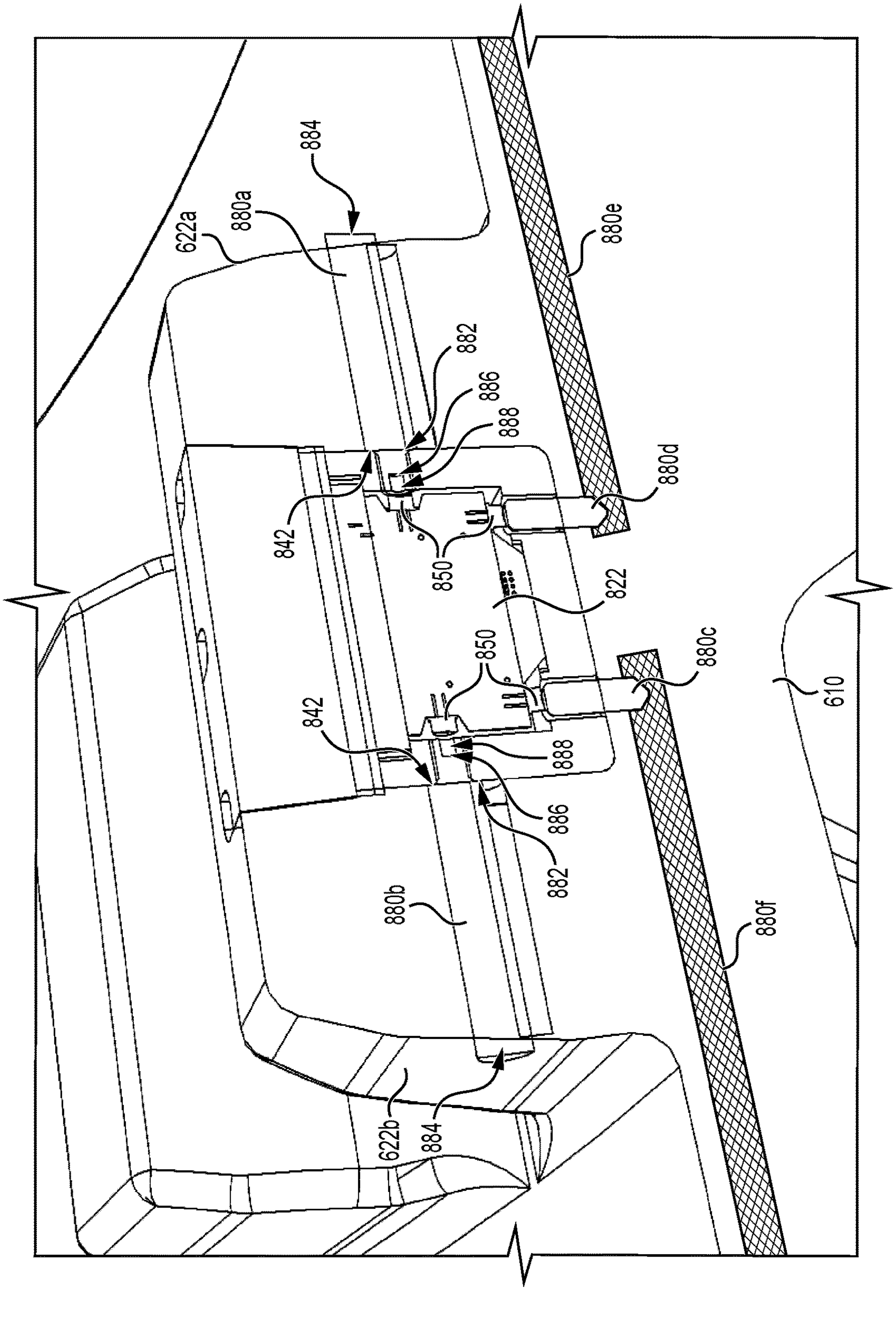
FIG. 18 is a perspective, cross-sectional view of the portion of the endless track of FIG. 14 taken along cross-section line 18-18.
Figure 19:
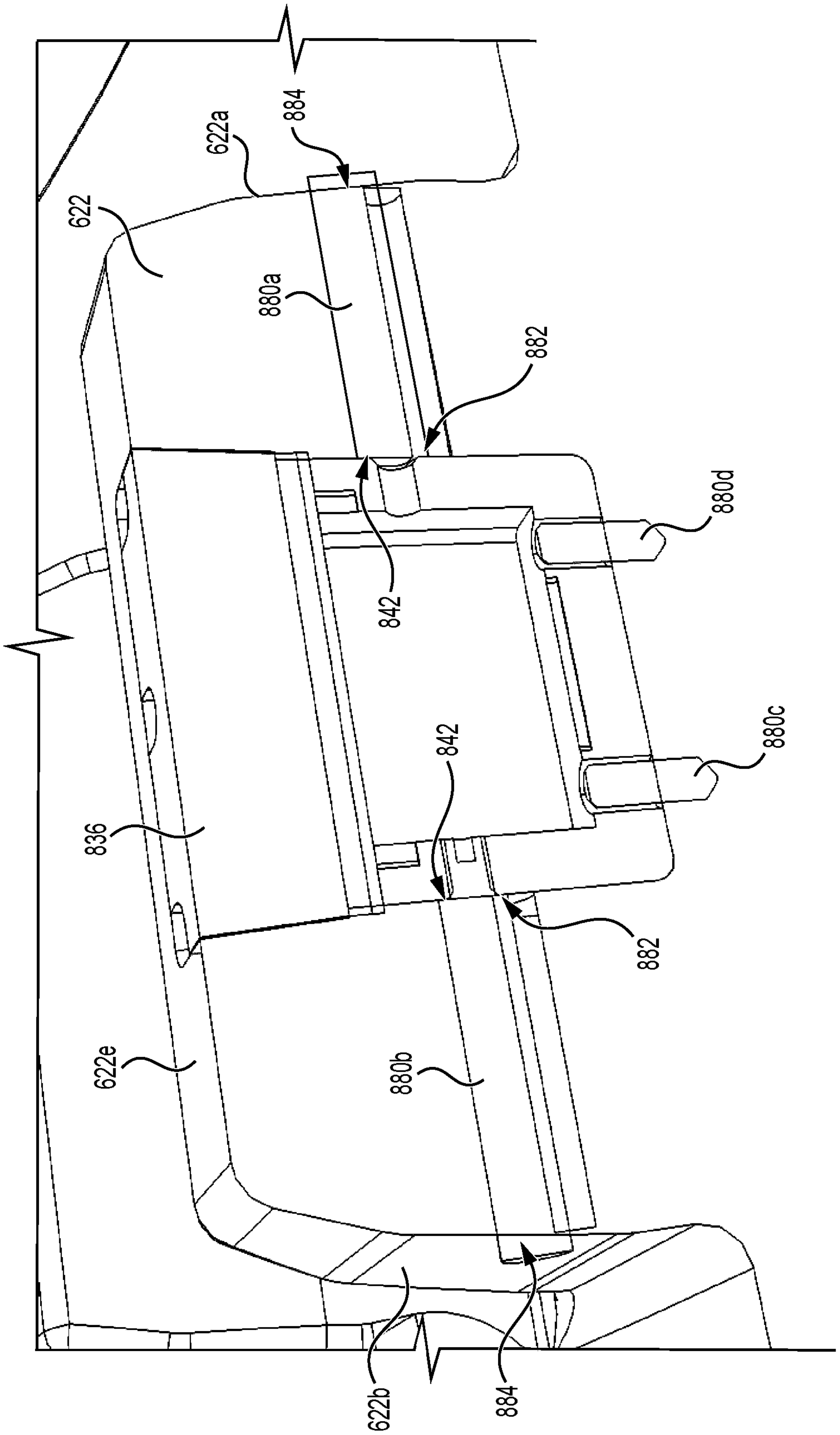
FIG. 19 is a perspective, cross-sectional view of the portion of the endless track of FIG. 14 taken along cross-section line 18-18, with the sensor being removed.

Each one of the probes **880*a*, 880*b* has a distal end 884. As best seen in FIGS. 18 and 19, the distal ends 884 are adjacent the side walls 622*a*, 622*b* of the lug 664 containing the housing 830. The probes 880*a*, 880*b* have a length that is about the same as the length of the receptacle 834, but it is contemplated that the probes 880*a*, 880*b* could have a length that could be even greater in other embodiments such as when the lug 622 is wider on the inner surface 620 of the endless track 600. Therefore, the probes 880*a*, 880*b* are capable of reaching locations that are remote to the sensor 820, and that a smaller, punctual temperature sensor that would be contained within the housing 830 would not sense. It is also contemplated that the probes 880 could extend otherwise in the endless track 600, such as being skewed at an angle from the housing 830** in a upward, downward, forward or rearward direction therefrom (or a combination thereof).

Figure 21:
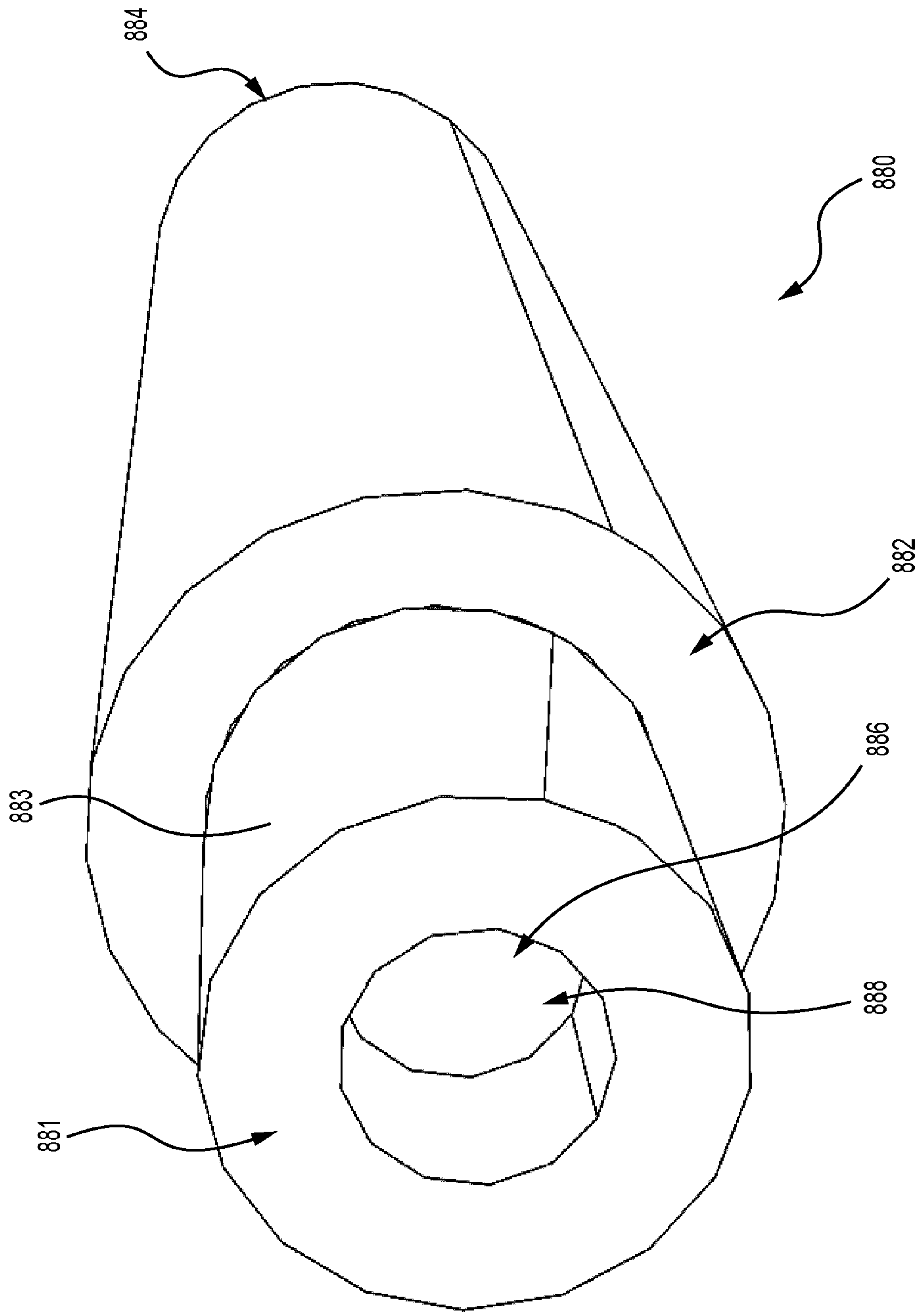
FIG. 21 is a perspective view taken from a front, top, left side of a probe of the system for monitoring the endless track.

Referring to FIGS. 18 and 21, each one of the probes 880 further has a transmission portion 886 that defines a recess 888 facing the corresponding temperature sensor 850. In the present embodiment, the transmission portion 886 is part of the connecting portion 883, but it could otherwise in other embodiments. The transmission portion 886 is received inside the housing 830. The recess 888 of the transmission portion 886 is aligned with the corresponding temperature sensor 850. Having the recess 888 defined in the transmission portion 886 improves the reliability of the temperature reading of the corresponding temperature sensor 850 due to the black body effect. A majority of the heat conducted by each one of the probes 880 is communicated to the corresponding temperature sensor 850 via infrared radiation, while a minority of the heat conducted by each one of the probes is communicated to the inside of the receptacle 834 via convection. Heat conducted via convection can be taken into account by the temperature sensor 870 in some circumstances.

Before further describing the operation of the system 800, it is to be noted that the system 800 has several functional advantages. First, there is no wired or mechanical connection between the temperature sensors 850 and their corresponding probe 880. This features permits convenient replacement of the sensor 820 if needed. Moreover, risks of rupture of components of the sensor 820 due to fatigue stresses are greatly reduced since the probes 880 and the temperature sensors 850 are decoupled. Second, the configuration of the probes 880 at the transmission portion 886 improves the reliability of the temperature reading of the corresponding temperature sensor 850. Third, the probes 880 extend within the endless track 600 and convey heat to the transmission portion 886. The probes 880 can thus provide the sensor 820 with temperature readings from regions of the endless track 600 that are remote to the sensor 820 itself. The probes 880 can thus provide a useful portrait of the temperature profile of different regions of the endless track 600 over time.

Furthermore, the probes 880 are made of a material that has a relatively high thermal conductivity in order for the heat that is generated within the endless track 600 during operation thereof to be conveyed efficiently to the corresponding temperature sensor 850. In the accompanying Figures, the probes 880 are illustrated a cylindrical bars, but they could have other shapes and structures in other embodiments. For example, in other embodiments, the probes 880 could be made of a weave, a belting, a mesh or a combination thereof of relatively high thermal conductivity materials, such as aluminum, copper, brass, and steelastic alloy. Moreover, in embodiments where the probes 880 is made of copper, which is a relatively soft metal, should one of the idler wheel assemblies 400*l*, 400*l* or support wheel assemblies 410*a*, 410*b*, 410*c* rub against an exposed distal end 884 of the probe 880, the probe 880 would wear before the idler wheel assemblies 400*l*, 400*l* or support wheel assemblies 410*a*, 410*b*, 410*c*. Referring to FIGS. 7 and 18, the probes 880*c*, 880*d* are connected to flexible probes 880*e*, 880*f* respectively (shown in dotted lines in FIG. 7). The probes 880*e*, 880*f* are made of a weave of copper threads. They could be made of other relative high thermal conductivity materials such as steelastic or aluminum. The probes 880*e*, 880*f* extend generally laterally in the carcass 610 and convey heat generated in the regions proximate the left side edge 630*l* and the right side edge 630*r* to the probes 880*c*, 880*d*. The probes 880*e*, 880*f* permit to convey heat generated in regions relatively remote of the probes 880*c*, 880*d* to the temperature sensor 850 and thus enable the sensor 820 to have a better representation of the heat profile in the endless track 600.

Since the probes 880 are made of a material that has a relatively high thermal conductivity, the probes 880 can spread at least some of the heat present in their vicinity (e.g. the lug 622 and the central region of the carcass 610) from relatively hot regions to relatively cool regions. This feature assists in reducing localized heat generation in the endless track and assist in reducing potential damages caused to the endless track 600 related to high temperature. The shape and configuration of the probes 880 can thus be selected to promote this effect of heat dissipation. It has been found that a probe 880 having a length over cross section ratio of 6 or less was desirable to achieve appreciable heat dissipation via the probe 880. Furthermore, it is to be noted even in cases where a user uses the endless track 600 without a sensor 820 received in the housing 830, the presence of the probes 880 within the endless track 600 would still provide the aforementioned advantage of heat dissipation. Moreover, should the probe 880 has cracks therein or be ruptured for some reason, the probe 880 would still provide at least some of the advantage of heat dissipation within the endless track 600.

An illustrative scenario is now provided to describe the operation of the system 800. In this scenario, the system 800 is configured to have the sensor 820 send to the receiver 810 the different temperature measurements received from the temperatures sensors 850, 870 every five minutes. It is contemplated that the sampling rate of the system 800 could vary in some conditions. For example, should the system 800 determines that some of the probes 880 provide temperature readings close to a threshold temperature, the sampling rate could be increased to closely monitor the evolution of temperature and prevent potential heat-related damage to the endless track 600. Conversely, should the vehicle 60 be at idle for an extended period of time, the sampling rate could decrease or the system 800 could be configured into "sleep mode".

The receiver 810 is in wireless communication with the sensors 820 and uses the different temperature sensors 850, 870 and the corresponding probes 880 to determine different measurements. The receiver 810 performs the data processing while the processing units 827 in the different sensors 820 process the signals from the temperature sensors 850, 870 to generate measurements to be sent to the receiver 810. The measurements include, and are not limited to: (i) each temperature sensor 850 provides a unique temperature reading; (ii) the processing unit 827 determines a temperature differential between a set of probes 880 (for example, the temperature differential between the left probe 880*a* and the right probe 880*b*); and (iii) the temperature differential between an average temperature of the probes 880 in the endless track 600 of the track system 40 and the average temperature of the probes 880 in the endless track 600 of the track system 40'.

The receiver 810 then compares the measurements to a relevant reference map. The receiver 810 uses the reference map to make extrapolation operations to determine the condition of the endless track 600. The reference map can take into account other factors, such as, and not limited to, outside air temperature, the distance travelled by the track system 40 over a period of time, a geolocation of the vehicle 60, an average speed of the vehicle 60 during a period of time, an instant speed of the vehicle 60, an inclination of the vehicle 60, and any other relevant factors. For example, in certain conditions, if the average temperature reading of the probes 880 in an endless track 600 is of 60° C., the outer surface 640 of the endless track 600 is likely to be of 70° C. If the system 800 determines that the temperature is above a threshold temperature for a predetermined amount of time, the receiver 810 could provide an indication to the driver of the vehicle 60 to take action (i.e. slow the vehicle 60 down).

If the receiver 810 determines that a temperature differential between a set of probes 880 (for example, the temperature differential between the left probe 880*a* and the right probe 880*b*) is outside a predetermined range for a predetermined amount of time provided on a relevant reference map, the receiver 810 could also provide an indication to the driver of the vehicle 60. For example, if the temperature differential between the left probe 880*a* and the right probe 880*b* is outside a predetermined range for a predetermined amount of time, the receiver 810 could provide an indication to the driver of the vehicle 60 to take action (i.e. check the tracking of the endless track 600 and/or camber of the track system 40).

In the later example, the temperature differential determined by the sensor 820 is a primary physical characteristic of the endless track 600 that can lead the receiver 810 to assess a secondary physical characteristic of the endless track 600, which can be, inter alia, the tracking of the endless track 600 and/or the camber of the track system 40. In other words, the system 800 permits assessing other physical characteristics of the endless track 600 and/or the track system 40 based on the temperature measurements provided to the receiver 810.

Figure 22:
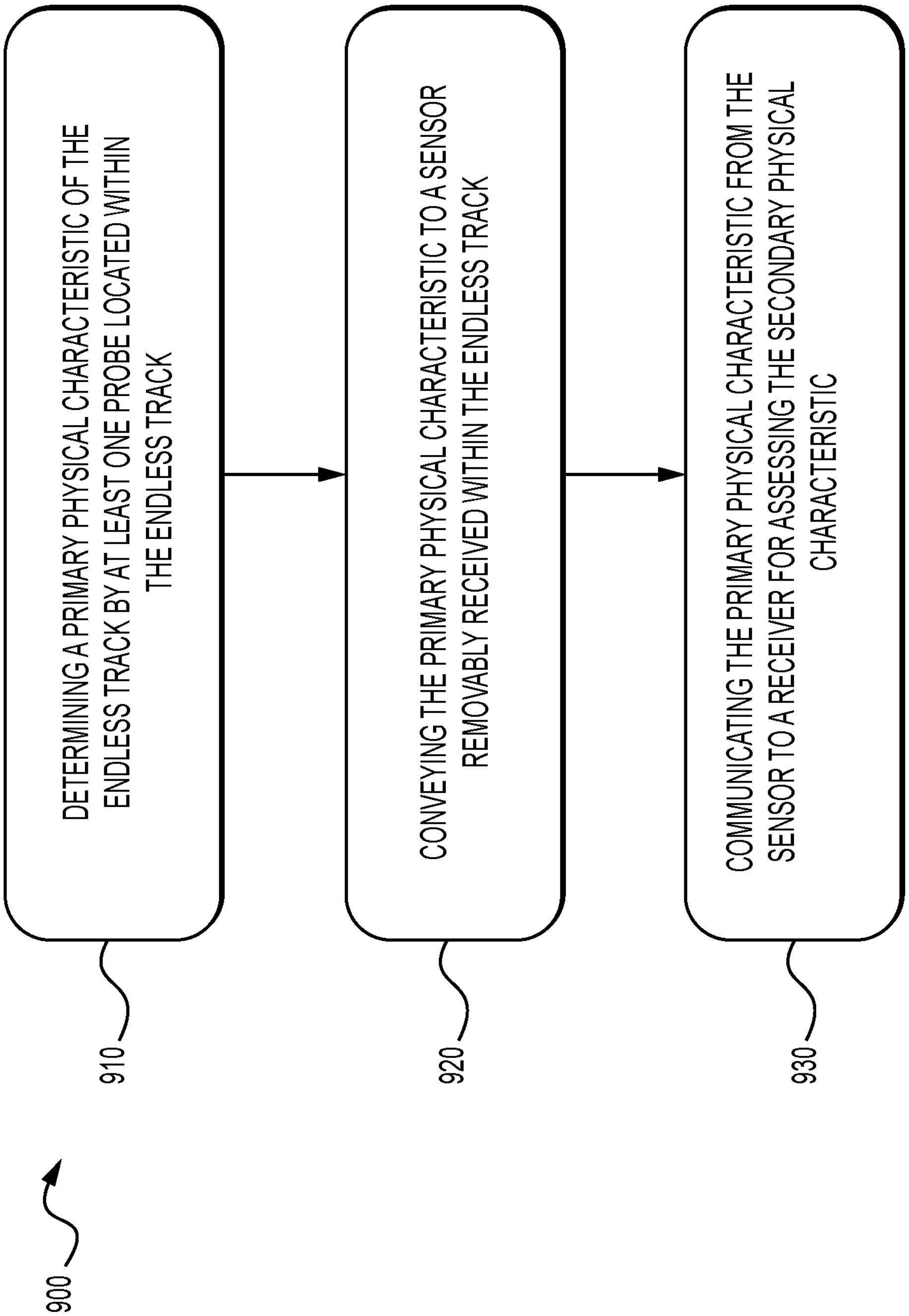
FIG. 22 is a flowchart of a method for assessing a secondary physical characteristic of an endless track used as a ground-engaging member of a vehicle, in accordance with an embodiment of the present technology.

Referring to FIG. 22, there is thus provided a method 900 for assessing a secondary physical characteristic of the endless track 600 used as a ground-engaging member of a vehicle 60. The method 900 involves at step 910 determining a primary physical characteristic of the endless track 600 by at least one of the probes 880 located within the endless track 600. In the present example, the primary physical characteristic is the temperature (or an indication of the temperature) of the endless track 600 at the location of the probes 880, and the secondary physical characteristic is the tracking of the endless track 600 and/or the camber of the track system 40. At step 920, the method 900 involves conveying the primary physical characteristic to the sensor 820 removably received within the endless track 600. At step 930, the method 900 involves communicating the primary physical characteristic from the sensor 820 to the receiver 810 for assessing the secondary physical characteristic (i.e. tracking of the endless track 600 and/or the camber of the track system 40).

The receiver 810 can also refine the assessment of the secondary physical characteristics of the endless track 600 based on the primary physical characteristic using several other relevant factors such as, and not limited to, the outside air temperature, geolocation of the endless track 600, inclination of a terrain travelled by the endless track 600, a nature of the terrain travelled by the endless track 600, time of day, weather data, distance travelled by the endless track 600, average speed of the vehicle 60 during a predetermined period, instant speed of the vehicle 60, and/or inclination of the vehicle 60.

In another example, the system 800 can assist in assessing the wear of the endless track 600. It is contemplated that the laterally extending probes **880*a*, 880*b* received within the endless track 600 could have varying diameter along their length and that a section of each probe 880*a*, 880*b* could be exposed at the surface of the corresponding left and right side wall 622*a*, 622*b* of the lug 622. Temperature readings over time from these probes 880*a*, 880*b* could allow the receiver 810 to detect what portion of the probe 880*a*, 880*b* is currently receiving heat, and assist the receiver 810 in measuring wear of the endless track 600**.

Referring back to FIG. 6, there is shown an embodiment of the system 800 where the receiver 810 is provided on the vehicle 60 and operatively connected to control systems 61 of the vehicle 60. The sensors 820 are operatively connected to the receiver 810 via their respective wireless communication device 826. The receiver 810 includes a processing unit, a memory, is programmable and is configured to send and receive signals from/to the sensors 820 and the vehicle 60. As the receiver 810 is simultaneously operatively connected to the sensors 820 and to the vehicle 60, data provided by the control systems 61 of the vehicle 60 is taken into account by the receiver 810 and supplemented to the signals received from the sensors 820 so as to have a more complete representation of the status of the vehicle 60 and track systems 40, 40', **40*r*, 40*r'***.

In some circumstances, the receiver 810 is connected to a remote network 1020 via a communication device 1030, and data provided by the sensors 820 and/or the control systems 61 of the vehicle 60 are collected by the receiver 810, uploaded to the remote network 1020 by the communication device 1030 and processed by a remote processing unit 1040 using, in some instances, supplemental data related to, for example, weather records, soil condition, etc. Processed data and/or control signals for the sensors 820 obtained from the remote processing unit 1040 are downloaded to the receiver 810 via the remote network 1020 and communication device 1030 so that the receiver 810 sends signals to the sensors 820 according to this processed data and/or control signals. The receiver 810 can thus have improved capabilities for monitoring the endless track 600 of the track systems 40, 40', **40*r*, 40*r'*** over time and usage.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A system for monitoring at least one physical characteristic of an endless track, the system comprising:

a sensor removably received within the endless track, the sensor being adapted for wireless communication with a receiver; and at least one probe received within the endless track, the at least one probe being adapted for operative communication with the sensor, the at least one probe detecting the at least one physical characteristic of the endless track and conveying the at least one physical characteristic to the sensor.

2. The system of claim 1, wherein the operative communication between the at least one probe and the sensor is achieved while the at least one probe is spaced from the sensor.

3. The system of claim 1, wherein the operative communication between the at least one probe and the sensor is achieved by radiation.

4. The system of claim 3, wherein the radiation includes infrared radiation.

5. The system of claim 1, wherein, when in operative communication, a spacing between the at least one probe and the sensor is comprised between 0.5 and 1.5 mm.

6. The system of claim 1, further comprising a housing received within a cavity defined in the endless track, the housing comprising: a receptacle structured to receive the sensor and to connect to the at least one probe; and a lid connectable to the receptacle.

7. The system of claim 6, further comprising a gasket disposed between the receptacle and the lid, the gasket being resiliently compressed between the receptacle and the lid when the lid is connected to the receptacle.

8. The system of claim 6, wherein the lid is suitable for being received within a portion of a lug of the endless track.

9. The system of claim 6, wherein the lid is suitable for being received within a portion of a drive lug of the endless track that is opposite to a ground engaging surface of the endless track.

10. The system of claim 6, wherein the lid has a top wall, and when the sensor is received in the receptacle and the lid is connected to the housing, the top wall is adapted to be coplanar with a top wall of the drive lug.

11. The system of claim 1, wherein the sensor includes an electronic circuit board supporting and electrically connecting:

a power source;

a processing unit powered by the power source;

at least one temperature sensor powered by the power source and operatively connected to the processing unit; and a wireless communication device powered by the power source and operatively connected to the processing unit, the wireless communication device being wirelessly connectable to the receiver.

12. The system of claim 11, wherein the at least one temperature sensor includes first and second temperature sensors, the first temperature sensor being configured to measure a temperature of the electronic circuit board, and the second temperature sensor being configured to measure a temperature of the at least one probe.

13. The system of claim 12, wherein the at least one temperature sensor further includes a third temperature sensor, the second temperature sensor being disposed on a first side of the electronic circuit board, and the third temperature sensor being disposed on a second side of the electronic circuit board, the second side being opposite the first side.

14. The system of claim 13, wherein the second temperature sensor faces in a first direction, and the third temperature sensor faces in a second direction.

15. The system of claim 11, wherein the electronic circuit board is connected to the lid of the housing so as to be insertable in the housing upon connection of the lid to the receptacle.

16. The system of claim 11, wherein the at least one temperature sensor is an infrared sensor.

17. The system of claim 11, wherein the wireless communication device comprises an antenna system located in a central portion of the electronic circuit board.

18. The system of claim 1, wherein the at least one probe is a temperature probe.

19. The system of claim 18, wherein the at least one probe is configured to dissipate heat within the carcass of the endless track.

20. The system of claim 18, wherein the at least one probe includes a connector for connecting the probe to the housing.

* * * * *